US008885099B2

(12) United States Patent
Balram

(10) Patent No.: US 8,885,099 B2
(45) Date of Patent: Nov. 11, 2014

(54) METHODS AND SYSTEMS FOR IMPROVING LOW RESOLUTION AND LOW FRAME RATE VIDEO

(75) Inventor: Nikhil Balram, Mountain View, CA (US)

(73) Assignee: Marvell World Trade Ltd., St. Michael (BB)

(*) Notice: Subject to any disclaimer, the term of this patent is extended or adjusted under 35 U.S.C. 154(b) by 1635 days.

(21) Appl. No.: 12/033,490

(22) Filed: Feb. 19, 2008

(65) Prior Publication Data

US 2008/0198264 A1 Aug. 21, 2008

Related U.S. Application Data

(60) Provisional application No. 60/902,027, filed on Feb. 16, 2007.

(51) Int. Cl.
*H04N 7/01* (2006.01)
*H04N 9/804* (2006.01)
(Continued)

(52) U.S. Cl.
CPC .............. *H04N 7/163* (2013.01); *H04N 5/781* (2013.01); *H04N 9/8042* (2013.01); *H04N 5/4401* (2013.01); *G09G 2320/0261* (2013.01); *H04N 21/440272* (2013.01); *G09G 5/003* (2013.01); *G04N 5/775* (2013.01); *H04N 21/440263* (2013.01); *H04N 9/804* (2013.01); *H04N 21/440281* (2013.01); *H04N 7/012* (2013.01); *H04N 5/765* (2013.01); *H04N 5/85* (2013.01); *H04N 9/7921* (2013.01); *H04N 7/0127* (2013.01); *G09G 2340/0414* (2013.01); *G11B 27/034* (2013.01); *H04N 7/01* (2013.01); *G09G 2340/14* (2013.01); *G06F 3/14* (2013.01); *H04N 5/772* (2013.01); *H04N 5/782* (2013.01); *G09G 2340/0435* (2013.01); *G09G 2310/0229* (2013.01); *G09G 2340/0421* (2013.01); *H04N 5/913* (2013.01); *G09G 2370/12* (2013.01); *G09G 2320/02* (2013.01)
USPC .......................................................... 348/441

(58) Field of Classification Search
None
See application file for complete search history.

(56) References Cited

U.S. PATENT DOCUMENTS 5,383,144 A 1/1995 Kato
5,828,786 A * 10/1998 Rao et al. ...................... 382/236
(Continued)

FOREIGN PATENT DOCUMENTS

EP 0 639 923 2/1995
EP 1 032 217 8/2000
(Continued)

OTHER PUBLICATIONS

Combettes et al., "Estimating First-Order Finite-Difference Information in Image Restoration Problems," 2004 International Conference on Image Processing (ICIP), International Conference on Singapore, Oct. 24-27, 2004, Piscataway, NJ, XP-010784819, pp. 321-324.
(Continued)

*Primary Examiner* — Paulos M Natnael

(57) ABSTRACT

Systems and methods are provided for improving the visual quality of low resolution and/or low frame rate video content displayed on large-screen displays. A video format converter may be used to process a low resolution and/or low frame rate video signal from a media providing device before the video is displayed. The video format converter may detect the true resolution of the video and deinterlace the video signal accordingly. The video format converter may also determine the frame rate of a video and may increase the frame rate if the received frame rate is below a certain threshold. For videos that are also low in quality, the video format converter may reduce compression artifacts and apply techniques to enhance the appearance of the video.

63 Claims, 19 Drawing Sheets

(51) Int. Cl.
*H04N 5/44* (2011.01)
*H04N 21/4402* (2011.01)
*G09G 5/00* (2006.01)
*H04N 5/765* (2006.01)
*H04N 7/16* (2011.01)
*G11B 27/034* (2006.01)
*G06F 3/14* (2006.01)
*H04N 5/77* (2006.01)
*H04N 5/781* (2006.01)
*H04N 5/85* (2006.01)
*H04N 9/79* (2006.01)
*H04N 5/782* (2006.01)
*H04N 5/913* (2006.01)

(56) References Cited

U.S. PATENT DOCUMENTS

| | | | |
|---|---|---|---|
| 5,974,193 A | 10/1999 | Baudouin | |
| 5,995,150 A * | 11/1999 | Hsieh et al. | 375/240.12 |
| 6,037,991 A * | 3/2000 | Thro et al. | 725/116 |
| 6,724,433 B1 * | 4/2004 | Lippman | 348/558 |
| 6,864,891 B2 * | 3/2005 | Myers | 345/502 |
| 6,906,687 B2 * | 6/2005 | Werner | 345/8 |
| 7,242,850 B2 * | 7/2007 | Cok | 386/241 |
| 7,257,158 B1 * | 8/2007 | Figueredo et al. | 375/240.01 |
| 7,333,545 B2 * | 2/2008 | Duruoz et al. | 375/240.25 |
| 8,139,121 B2 * | 3/2012 | Ito | 348/222.1 |
| 2002/0080882 A1 | 6/2002 | Kitagawa | |
| 2002/0103007 A1 * | 8/2002 | Jaggers et al. | 455/557 |
| 2002/0118296 A1 | 8/2002 | Schwab et al. | |
| 2003/0194151 A1 * | 10/2003 | Wang et al. | 382/300 |
| 2004/0136686 A1 | 7/2004 | Kono et al. | |
| 2004/0257434 A1 | 12/2004 | Davis et al. | |
| 2005/0046746 A1 | 3/2005 | Choi | |
| 2005/0225564 A1 | 10/2005 | Shan | |
| 2006/0140268 A1 * | 6/2006 | Ha et al. | 375/240.03 |
| 2006/0152627 A1 | 7/2006 | Ruggiero et al. | |
| 2006/0218482 A1 * | 9/2006 | Ralston et al. | 715/500.1 |
| 2008/0211959 A1 | 9/2008 | Balram et al. | |

FOREIGN PATENT DOCUMENTS

| | | |
|---|---|---|
| EP | 1 244 301 | 9/2002 |
| EP | 1 401 210 | 3/2004 |
| EP | 1551181 A2 | 7/2005 |
| EP | 1 560 438 | 8/2005 |
| EP | 1638329 A2 | 3/2006 |
| EP | 1677533 A2 | 7/2006 |
| WO | WO 2005/076595 | 8/2005 |
| WO | WO 2005/107272 | 11/2005 |
| WO | WO 2006/020119 A2 | 2/2006 |
| WO | WO 2006/109863 A1 | 10/2006 |
| WO | WO 2006/113776 A2 | 10/2006 |

OTHER PUBLICATIONS

Suwendi et al., "Nearest-neighbor and Bilinear Resampling Factor Estimation to Detect Blockiness or Blurriness of an Image," Proceedings of the Digital Publishing Conference, San Jose, CA., Jan. 16, 2006, SPIE-International Society for Optical Engineering, XP-002492588, vol. 6076, Jan. 2006, pp. 6076C-1-6076C-8.

Chao, Teh-Tzong et al. "Motion-Compensated Spatio-Temporal Interpolation for Frame Rate Up-Conversion of Interlaced or Progressive Image Sequence" Proc. SPIE, vol. 2308, pp. 682-693, Chicago, IL (Sep. 29, 1994).

* cited by examiner

METHODS AND SYSTEMS FOR IMPROVING LOW RESOLUTION AND LOW FRAME RATE VIDEO

CROSS-REFERENCE TO RELATED APPLICATIONS

This application claims the benefit under 35 U.S.C. §119 (e) of U.S. Provisional Application No. 60/902,027, filed Feb. 16, 2007. This application is also related to U.S. patent application Ser. No. 11/969,705, filed Jan. 4, 2008. Both of these prior applications are hereby incorporated by reference herein in their entirety.

BACKGROUND OF THE INVENTION

This invention relates to electronic devices, and more particularly to portable media devices that have video capabilities.

Videos provided on the Internet are becoming a popular form of media. Conventionally, Internet-provided videos are displayed on personal computer (PC) or laptop monitors, where the screen sizes are relatively small. However, with improvements in networking, Internet content may be displayed on other devices with larger screens, such as on television screens. Internet-provided videos differ from videos typically displayed on a television, since Internet-provided videos generally have low resolution. Therefore, when Internet content is shown on a large-screen television, there may be very little detail in the picture, creating an unpleasant viewing experience.

In addition, many videos on the Internet are user-generated, and are thus created by amateurs who are unfamiliar with or unable to use professional techniques in video-generation. For example, user-generated videos may be filmed on hand-held video cameras. Thus, due to the shaking camera, the frame-by-frame video may change even for unchanging backgrounds. For a given data rate, this causes a disproportionate amount of compressed video data to be used on backgrounds and other still images. For this and other reasons, user-generated content often suffers not only from low resolution, but also from artifacts. Artifacts are referred to herein as visually displeasing portions in a display that are caused by video compression. Common artifacts include blocking artifacts and mosquito noise. Blocking artifacts refer to the blocky appearance of a low resolution video that is typically seen on areas of less detail in the image. Mosquito noise is a ringing effect, caused by truncating high-frequency luminance and/or chrominance coefficients, typically seen around sharp edges in the video. When videos with low resolution and compression artifacts are blown up to a large size, the picture quality may become unacceptably poor.

Furthermore, processing techniques performed by large-screen display devices when preparing a video signal for display on the device may worsen the presentation of low-resolution video. One such processing technique performed by display devices is deinterlacing, a process that changes the way that pixels are drawn on a screen. Videos are displayed by a display device by drawing successive images at fast enough rate (e.g., 50 frames per second). Typically, a display presents these images pixel by pixel using either a progressive or interlaced scan. A progressive scan draws out each pixel in an image from the top of the screen to the bottom. Thus, after each scan, a progressive display displays an entire frame. An interlaced scan, on the other hand, draws out the odd pixel lines in an image. Then, at the next time instant, the even pixel lines are drawn out. An interlaced scan, therefore, creates a video by alternating between displaying the odd lines and displaying the even lines of successive images. These half-resolution images are called fields.

Currently, many display devices (e.g., some digital televisions, liquid crystal displays (LCDs), etc.) are progressive displays. However, video transmission standards, such as television broadcast standards, commonly use interlacing. Therefore, these display devices often include deinterlacing circuitry for converting interlaced videos to progressive videos. There are several different deinterlacing techniques employed by digital display devices. These techniques attempt to display an interlaced video with the highest possible visual quality. Thus, to effectively display television broadcasts and other interlaced videos, the deinterlacing circuitry in televisions and other display devices are becoming increasingly complex and sophisticated.

In general, because of these deinterlacing and other new, sophisticated techniques for effectively processing higher-resolution video signals, viewers have come to expect vivid and high-quality images on their television sets. In particular, these techniques are being incorporated into regularly available television sets for displaying large images with higher brightness, contrast, and resolution. However, these deinterlacing and/or other complex processing techniques may not be effective when performed on low-resolution and/or low frame rate, and possibly poorly compressed, videos. Therefore, there is currently no effective way to present both high-resolution video content, such as television broadcasts, and low-resolution video content, such as Internet content, on a large-screen device. Thus, it would be desirable to improve the appearance of low-resolution video on large-screen displays.

Other than videos from the Internet, videos may be provided by portable media players or other portable media devices that are either captured by the device or obtained elsewhere. These portable devices are capable of storing and providing a large amount of video content. In fact, many of these portable media players may store 80 Gigabytes or more of video content. With that much memory, a portable media player can store and playback many hours of video content. Thus, users can easily carry around devices with large amounts of video content.

Also, as technology improves, these portable media devices are becoming increasingly complex, and may therefore have an increasing number of functions. For example, there are cellular telephones with video capture, storage, and playback capabilities. Thus, the media stored by portable media devices may include video captured by the device itself. The quality of a captured video, in terms of resolution and frame rate, may be acceptable when the video is played back on the small display of the portable media device. Yet, because of the small size of the portable media device display, it may be desirable to display the captured video content on a large screen display, such as on a television. However, because of a viewer's high expectation of content quality on televisions and other large-screen devices, when a video captured by a portable media device is displayed on the large screen, a viewer may find the video content unacceptably poor.

Thus, it would also be desirable to provide a method or system for effectively displaying videos captured from a portable media device, or other videos captured with low resolution and/or low frame rate, on a large-screen device.

SUMMARY OF THE INVENTION

Accordingly, systems and methods are provided for improving the visual appearance of low-resolution and/or low frame rate video displayed on high-resolution, large-screen devices.

In accordance with one aspect of the invention, a video format converter is used to process a video provided by a video providing device (e.g., a portable media player) before it is processed by a large-screen device. The video format converter may be embedded in a device, referred to as a dock or docking station, that is external to both the video providing device and the large-screen device. In some embodiments, the dock may be designed for a specific type of video providing device, or may be designed for a specific brand of a video providing device. For example, the dock may have an interface that is shaped such that it may only accept input from a portable media player of a certain brand. In these embodiments, the video providing device and the dock may communicate using a non-standard, or proprietary interface. The dock may additionally be used as a charging station for the video providing device.

The video format converter, which may or may not be within a dock, may process videos that have low resolution. Oftentimes, low-resolution video is transmitted using a video transmission standard for higher resolution videos, so the low-resolution video appears to possess a higher resolution that it actually has. Thus, to determine whether to deinterlace and/or process the video signal using a low-resolution technique, the video format converter may detect the true resolution of the video content. In some embodiments, if the video converter detects that the video is low-resolution and interlaced, the video converter's deinterlacer may deinterlace the received video signal using a technique determined based on the true resolution. In other embodiments, the video converter's deinterlacer may convert the received video signal to its true resolution and deinterlace the converted video signal. Either way, the video converter produces a progressive video signal (e.g., in HDMI or DVI format, etc.). Therefore, the deinterlacing circuitry of the large-screen device, which may be unsuitable for low-resolution video, is avoided.

In accordance with another aspect of the present invention, the video format converter may take additional processing steps to improve the appearance of low-resolution videos that are also low in quality. In some embodiments, to determine whether a video signal needs additional processing, the video converter may look for a low-quality signature in the video signal. If the video converter determines that a video signal is low-quality, it first reduces the artifacts in the video signal using, among other techniques, MPEG noise reduction for reducing mosquito noise and blocking artifacts. Because of the low quality compression, much of the information in the compressed video file may be noise information rather than true video information. Thus, there may be relatively little video data remaining after this noise information is reduced or removed. The reduced video signal is then enhanced to improve the appearance of the noise-reduced video. In some embodiments, enhancing the video signal involves increasing the contrast of the picture. In some embodiments, enhancing the video signal involves adding film grain to create the illusion of texture and to cover up deficiencies in the picture. These and other techniques for enhancing the video signal improve the visual perception of a viewer when there is little detail in the picture.

In accordance with another aspect of the present invention, a video format converter may process a video with a low frame rate before the video is provided to a large-screen display. The video format converter may perform frame rate conversion to convert a low frame rate video into a higher frame rate video using, for example, motion-compensated frame rate conversion. The video format converter may determine the frame rate of a received video, and may ignore frames that are duplicates of other frames or otherwise not necessary. In some embodiments, the video format converter can convert the video to a higher, intermediate frame rate, which can be processed again by a large-screen display device to generate a final video of even higher frame rate. Using this technique, a portable media player, or any other suitable video providing device, may capture or otherwise obtain video at low frame rate without sacrificing the appearance of the video content. Therefore, the video capturing circuitry of the video capturing device may be greatly reduced, or the size of the video may be reduced. This can be advantageous especially for portable devices that have limited capabilities and other constraints.

In some embodiments, a video format converter may include both a deinterlacer and a frame rate converter, and any associated or additional circuitry. Using a combination of the techniques described above, the video converter may convert a low resolution and low frame rate video into a video that may be effectively displayed on a large-screen display. Therefore, a video providing device may provide video content of a particular combination of (low) frame rate and (low) resolution that may be effectively processed by the video format converter for display on a large-screen device. Alternatively, the video format converter may be designed specifically for the particular video characteristics provided by a particular video providing device.

Thus, in some embodiments, a video format converter may be provided for processing video content for display on a video display. The video format converter can include means for receiving a video signal corresponding to the video content. The received video signal may have a first frame rate that is higher than a frame rate at which the video content was captured. The video format converter may also include means for detecting the frame rate at which the video content was captured from the received signal and means for performing frame rate conversion based on the detected frame rate. The means for performing frame rate conversion may convert the received video signal to video content that has a frame rate substantially higher than the frame rate at which the video content was captured.

The video format converter may include means for converting the received video signal from a first transmission standard to a second transmission standard. The second transmission standard may be the same as the first transmission standard. Alternatively, the second transmission standard may be associated with a second frame rate that is higher than a first frame rate associated with the first transmission standard. For example, the video content may have been captured at 15 fps, the first frame rate of the first transmission standard may be 30 fps, and the second frame rate of the second transmission standard may be 60 fps. In some embodiments, the second frame rate that the video signal is converted to may correspond to a frame rate of the video display.

The means for detecting the frame rate may include means for detecting frame replications in the video signal. For example, the means for detecting frame replications can compare pixels in one frame to equivalent pixels in successive frames. In some embodiments, the video format converter may further include means for determining whether the frame rate at which the video content was captured is below a predetermined threshold, and means for bypassing the means for performing frame rate conversion if the frame rate is not below the predetermined threshold.

In some embodiments, the means for performing frame rate conversion may include means for determining motion of objects in successive frames of the video content, and means for adding intermediate frames based on the determined motion. The motion of the objects may be determined based on only the original frames of the video content, and not other intermediate frames that were subsequently added. To perform frame rate conversion, the means for performing frame rate conversion may include means for performing a first conversion to convert the received video signal to a video signal with the frame rate at which the video content was captured, as well as means for performing a second conversion to convert the converted video signal to a video signal with a second frame rate. The second frame rate may be substantially greater than the first frame rate.

The video converter may include means for detecting a resolution at which the video content was captured from the received video signal. This resolution may less than the resolution at which the video signal is transmitted. To improve the appearance of the received video signal, the video format converter may include means for deinterlacing the video signal based on the detected resolution.

In some embodiments, the video format converter may improve a low-quality video signal. The video format converter can include means for detecting a compression quality of the video content, and may include means for bypassing the means for reducing artifacts if the compression quality is greater than a threshold. To improve low-quality signals, the video format converter may include means for reducing artifacts in the video signal. The means for reducing artifacts may perform one or more of 3D noise reduction and MPEG noise reduction. The video format converter may also include means for enhancing the video signal, which may operate on the video signal after the artifacts have been reduced. To enhance the video signal, the means for enhancing may perform one or more of color remapping, contrast enhancement, and film grain addition.

In another embodiment of the present invention, a system is provided for obtaining and processing video content for display on a display device. The system can include means for capturing the video content on a portable media device (e.g., a portable device having telephonic capabilities) at a first frame rate and means for converting the captured video content to video content with a second frame rate. The means for converting the captured content may be on a device acting as an interface between the portable media device and the display device, and the second frame rate may be substantially greater than the first frame rate. The first frame rate may be based on user settings or the capabilities of either the portable media device or the device acting as an interface, for example.

The device acting as an interface between the portable media device and the display device may additionally provide power to the portable media device. Optionally, a primary function of this device may be to process video content for display on the display device.

In some embodiments, the captured video content may have a first frame rate, and the captured video content may be provided to the device acting as interface at a frame rate higher than the first frame rate (e.g., based on a video transmission standard) or at the first frame rate. In some embodiments, the captured video content may be provided to the device acting as interface using a proprietary interface, and the system can further include means for encoding the video content at the second frame rate on the device acting as an interface using a video transmission standard.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
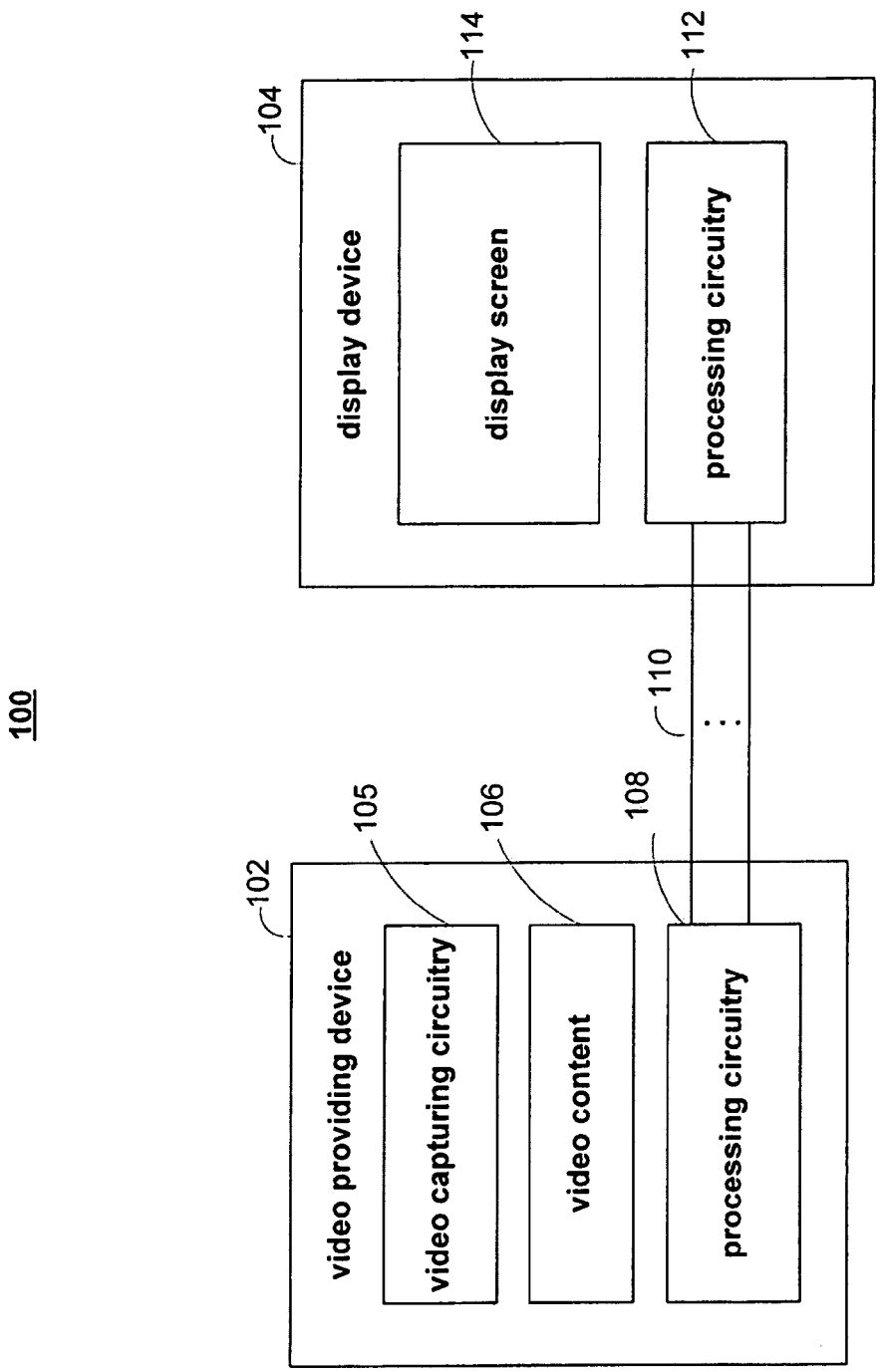
FIG. 1 shows a video providing device coupled to a display device.

FIG. 1 shows illustrative system 100 for providing video content to a display device. Display device 104 in system 100 may be a television or any other device that can display video. Video content 106 may be provided for display on display device 104 by video providing device 102. Video providing device 102 may be a portable media player, a DVD player, a set top box, or any other suitable device that may provide video.

Video content 106 may be captured by the video providing device. Video providing device 102 may include video capturing circuitry 105 for capturing and encoding videos. To generate a video, video capturing circuitry 105 may capture successive images at predetermined time intervals (e.g., every 33 millisecond). Thus, the video capturing circuitry may encode the captured frames in real time using intra-frame and/or inter-frame encoding techniques. The time intervals of the successive images may correspond to the frame rate of the corresponding video that video providing device 102 eventually provides to display device 104.

In some embodiments, video capturing circuitry 105 may include circuitry to convert video content from another source (e.g., the Internet, a DVD, etc.) to video content suitable for storage and/or display on the video providing device. For example, video capturing circuitry 105 may convert a DVD video at a resolution of 720×480 and frame rate of 30 frames per second to a 320×240 video at 15 frames per second. Thus, the video content may take up less memory in the video providing device if it is stored on the device. Also, if video providing device 102 is a portable media player and includes a small-screen display, depending on the expected resolution and/or frame rate of video content displayed on the small-screen display, this lower resolution and/or frame rate video may still be displayed effectively on the display of the portable media device.

Video content 106 provided to display device 104 by video providing device 102 may be content captured by video capturing circuitry 105 and stored in a memory in the video providing device, or video content 106 may be content stored at and obtained from another source (e.g., the Internet, etc.). The video content may be captured by another device with video capturing capabilities, and transferred to video providing device 102 for storage using any suitable means. Alternatively, the video providing device may obtain and provide video content 106 directly from an external source (e.g., the Internet, a DVD, etc.). Video content 106 may have any suitable resolution (e.g., 320×240, 160×120, 640×480, 1920× 1080, etc.), may use any suitable encoding (e.g., uncompressed, H.264, MPEG, etc.), may have any suitable frame rate (e.g., 15 frames per second (fps), 30 fps, 60 fps, etc.), and may have any other suitable video characteristics. If video content 106 is captured by video capturing circuitry 105, the characteristics of the video content may depend on the capabilities of the video capturing circuitry or on user-settings.

Video providing device 102 includes processing circuitry 108. Processing circuitry 108 converts video content 106 into a video signal suitable for transmission to display device 104. The video signal may be of any suitable format. For example, the video signal may be in composite video, S-Video, or component video (e.g., YPbPr, RGB, etc.) format. The video signal may utilize a digital format such as a high-definition multimedia interface (HDMI) or digital video interface (DVI) format. Processing circuitry 108 may include an encoder to map video content 106 to a video signal of a given video transmission standard. Processing circuitry 108 may include, for example, National Television Systems Committee (NTSC), phase alternating line (PAL), or SECAM encoders. If the actual resolution of video content 106 is lower than the resolution set by the video transmission standard, processing circuitry 108 may fake a higher resolution by duplicating pixels. Similarly, if the actual frame rate of video content 106 is lower than the frame rate set by the standard, processing circuitry 108 may fake a higher frame rate by duplicating frames. For simplicity, when appropriate, "video content" and "video signal" may hereinafter be used interchangeably. For example, a "low-resolution video signal" refers to a video signal corresponding to low-resolution video content.

The video signals from processing circuitry 108 may be transmitted to display device 104 using link 110. Link 110 may be one or more cables or other wired connections. Link 110 may also be a wireless connection. The transmitted video signal is received from link 110 by display device 104. Display device 104 may include processing circuitry 112 and display screen 114. Display screen 114 displays a processed version of video content 106 to a user. Display screen 114 may have any suitable resolution (e.g., 640×480, 1280×720, etc.) and may display video content at any suitable frame rate (e.g., 60 fps, 120 fps, etc.). Processing circuitry 112 processes the video signal received from link 110 and prepares the video for display on display screen 114. Processing circuitry 112 may process the video signal based on the resolution, frame rate, and/or other characteristics of display screen 114, and may attempt to improve the visual quality of the video.

For progressive displays, or displays that show full frames at each time instant, processing circuitry 112 includes circuitry to deinterlace interlaced video. An interlaced video is one that is composed of two types of fields: an odd field consisting of the odd lines of pixels in an image and an even field consisting of the even lines in an image. To create an interlaced video, the two types of fields are displayed in an alternating fashion at each time interval (e.g., every 16.67 milliseconds for NTSC, every 20 milliseconds for PAL, etc.). Thus, odd fields are displayed at every other time interval, and even fields are displayed in the remaining time intervals. Since only half the pixels in a display are utilized at any given time instant, an interlaced video has at most half the resolution of the display. A progressive video, on the other hand, may utilize up to the full resolution of the display. Converting an interlaced video to a progressive video involves a process referred to as deinterlacing. Deinterlacing involves determining odd pixel lines in an even field and/or determining even pixel lines in an odd field using incomplete information. More properties of display device 104 will be discussed below in connection with FIG. 2.

Figure 2:
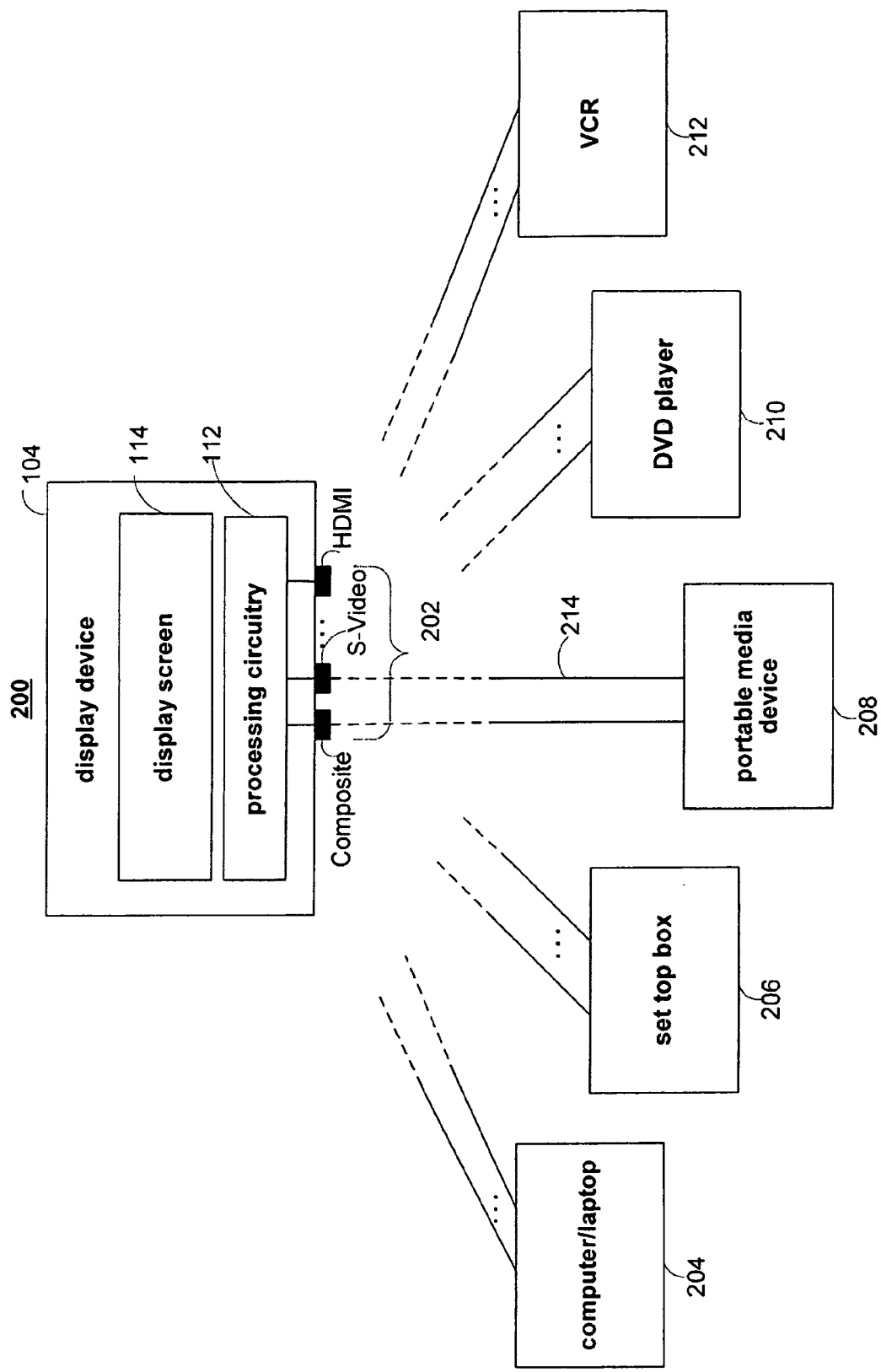
FIG. 2 illustrates a number of video providing devices that may connect to a display device.

System 200 in FIG. 2 is an illustrative system that includes multiple types of video providing devices. The video providing devices in system 200 include portable media device 208 (e.g., video MP3 player, video-ready mobile telephone, a personal digital assistant (PDA), a portable DVD player, a hybrid device combining the capabilities of different portable devices, etc.), DVD player 210, set top box 206, video cassette recorder (VCR) 212, and computer/laptop device 204. It should be understood that any other type of video providing device may be included in system 200, and therefore system 200 is not limited to the video providing devices shown in FIG. 2. For example, system 200 may include video providing devices other than DVD player 210 that support removable digital disks (e.g., HD-DVD and Blu-ray disks). Thus, although reference is made to DVDs in various embodiments throughout this disclosure, it should be understood that these embodiments may be applied to HD-DVD and Blu-ray.

Figure 4:
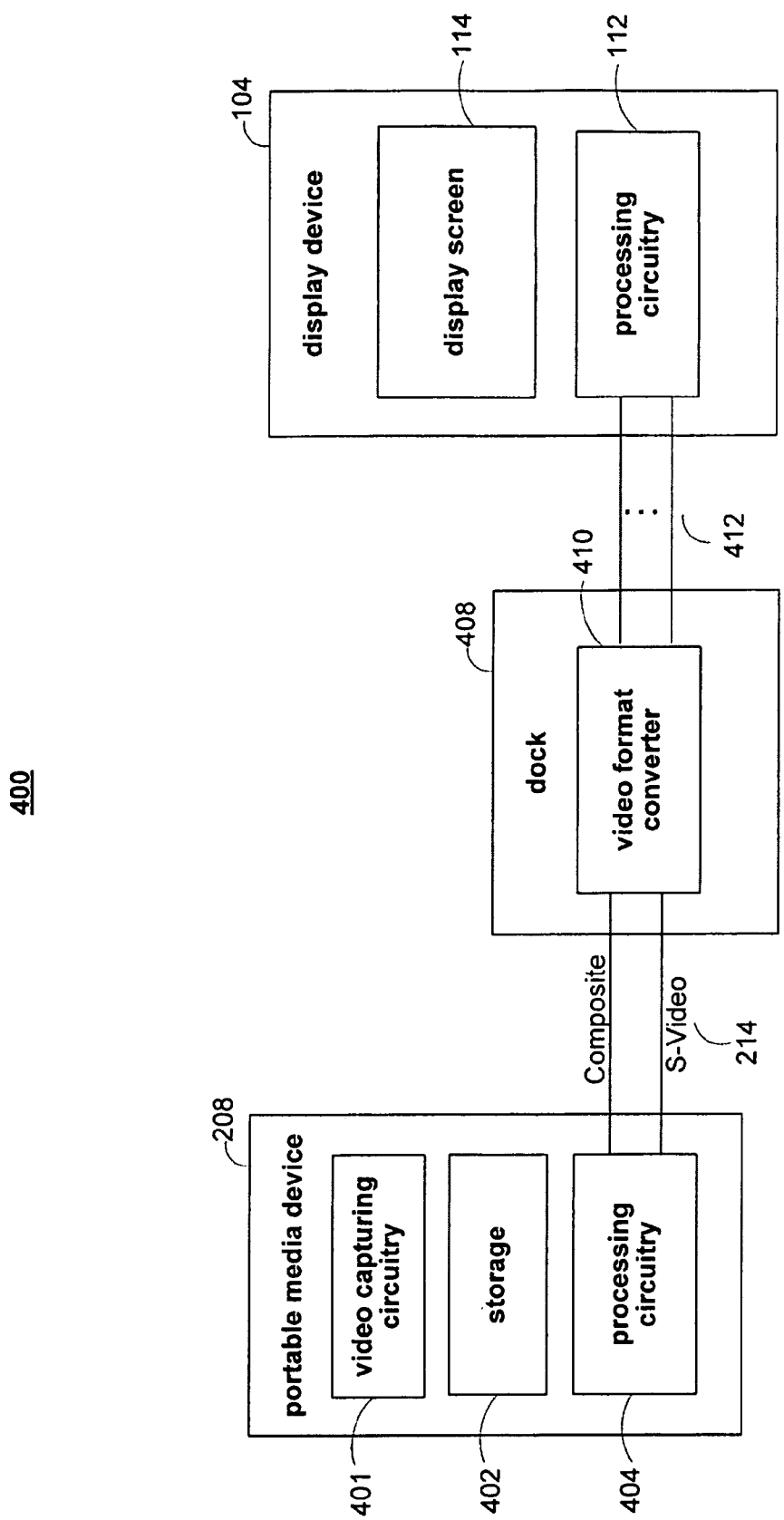
FIG. 4 illustrates a system using a dock or other hardware for processing a video signal.

In some embodiments, portable media device 208 may be a portable device that cannot play video, but may store and provide video content to a display device (e.g., a portable hard drive, etc.). Each video providing device in system 200 may support one or more of the formats and standards described above in connection with FIG. 1, or any other suitable format or standard. For instance, portable media device 208 may provide video signals in composite and S-Video formats via link 214. Link 214 may include any number of wired (e.g., cables, etc.) or wireless links. While portable media device 208 is shown in FIGS. 2 and 4 to provide video signals in composite and S-Video formats, this is merely one illustrative example. In some embodiments, portable media device 208 may support other suitable output formats instead of or in addition to composite and S-Video, such as any of the formats discussed above in connection with FIG. 1. For example, portable media device 208 may support component video that is either interlaced or progressive, and/or may support one or more digital video interfaces, such as HDMI or DVI.

As shown in FIG. 2, display device 104 may have one or more sockets/interfaces 202 (not pictured in FIG. 1) to receive video signals, where each interface may support one or more of the video formats described above in connection with FIG. 1. For example, display device 104 may have separate input sockets or connectors for composite video, S-Video, component video, HDMI, and DVI. Therefore, any video providing device in system 200 may provide video content via one or more of sockets 202. If link 214 is wireless, sockets/interfaces 202 may be a network interface. In system 200, portable media device 208 is shown to be coupled to display device 104 through the composite video and S-Video sockets, but any of the other video providing devices may be coupled to display device 104 using one or more of these or other sockets. Thus, multiple types of video providing devices may provide video content to display device 104 using the same interface.

Processing circuitry 112 (FIG. 2) can receive a video signal from one of sockets/interfaces 202. Processing circuitry 112 can process the received video signal to display video content on display screen 114. Processing circuitry 112 may perform frame rate conversion to convert the frame rate of the video signal to a frame rate used by the display device. For example, processing circuitry may receive a video signal from a television broadcast at 60 fields per second, and convert the broadcast to full-resolution 60 frames per second. To convert the television broadcast, or any other interlaced video, to a frame-based video, processing circuitry 112 may use 3-dimensional (3D) deinterlacing to convert the received video signal to a progressive format. 3D deinterlacing may obtain full frames from half-resolution fields by spatial interpolation (e.g., pixel replication, averaging neighboring pixels, etc.) and/or by temporal combining (e.g., combining an odd and even field, etc.). Thus, 3D deinterlacers may utilize all relevant information (e.g., spatial and temporal) in order to deinterlace a video signal. These processing techniques may be suitable for videos that are already somewhat high-resolution and have a higher frame rate, such as videos meant for display on a television (e.g., a television broadcast received by set top box 206, a commercial movie from DVD player 210, etc.).

However, the characteristics of video content often vary depending on the type of video providing device. Although many devices provide high-resolution (e.g., 720×480), high frame rate (e.g., 60 fields per second), and high-quality (professionally-generated) videos, many video providing devices may provide lower-resolution (e.g., 320×240, 160×120, etc.), lower frame rate (e.g., 15 fps or 30 fields per second, etc.), and/or lower-quality (e.g., amateur-generated) videos. For example, computer/laptop device 204 and set top box 206 may provide Internet content, which are often low-resolution and/or user-generated. Any of the video providing devices shown in system 200 (FIG. 2) may provide video content that is highly compressed, and therefore low in quality. Furthermore, portable media device 208, due to its small screen size, may provide videos that have low resolution. In some cases, portable media device 208, or any other video providing device, may have intentionally converted a higher resolution/frame rate video to a low resolution and/or low frame rate video to conserve memory in the device. Also, portable media device 208, or any other video providing device, may provide content captured by the portable device itself. Because video content is captured and encoded in real time, and it may be undesirable to implement large, highly power consuming, and/or complex circuitry on a portable device, the video capturing circuitry of a portable media device may sacrifice frame rate for resolution, or vice versa. That is, if the frames of a video are captured at a high resolution, the encoding circuitry necessary to encode the high-resolution frames may make it impractical to encode frames at a high rate. Therefore, the video content captured by portable media device 208 may have low resolution and/or low frame rate.

In some embodiments, portable media device 208, or any other video providing device, may change its capturing and encoding settings. The settings may be designated by a user. For example, portable media device 208 may have a switch that allows a user to choose between a higher-resolution/lower-frame rate setting and a lower-resolution/higher-frame rate setting. A user may then choose which setting to use based on the type of video that that the user expects to shoot. For instance, a user may choose to capture a video of relatively unmoving scenery at high resolution. In some embodiments, portable media device 208, or any other video providing device, may allow the user to purposefully capture video at a quality lower than the capabilities of the video capturing circuitry. Thus, a user may choose to save a video at a low frame rate and/or low resolution to save memory on the device. In some embodiments, the video providing device may change its capturing and encoding settings automatically based on the amount of motion of various objects.

In some embodiments, portable media device 208, or any other video providing device, may change its settings for converting video from an external source. Portable media device 208 may allow a user to choose the frame rate of the converted video by, for example, flipping a switch on the device or entering a preference from a menu on the device. Thus, a user may choose to save an externally-provided video at a low frame rate and/or low resolution to save memory on the device. In some embodiments, the video providing device may change its conversion settings based on analyzing video content and determining the amount of motion in the video.

In general, due to the variety of video providing devices, the variety of video capturing capabilities or settings the video providing devices may have, and the variety of video compression/encoding algorithms, the resolution and quality of videos provided to display device 104 may vary considerably. Processing circuitry 112, however, is typically not aware of the origins of a video signal, and may therefore process a low-resolution and/or low frame rate video signal in substantially the same way as a high-resolution, high frame rate signal. These processing techniques, such as the above-described 3D deinterlacing technique, may not be as effective for low-resolution, low frame rate, and/or low quality video signals. In fact, in some instances, applying processing techniques intended for high-resolution and high frame rate video may actually reduce the visual quality of a low-resolution and/or low frame rate video signal.

Figure 3:
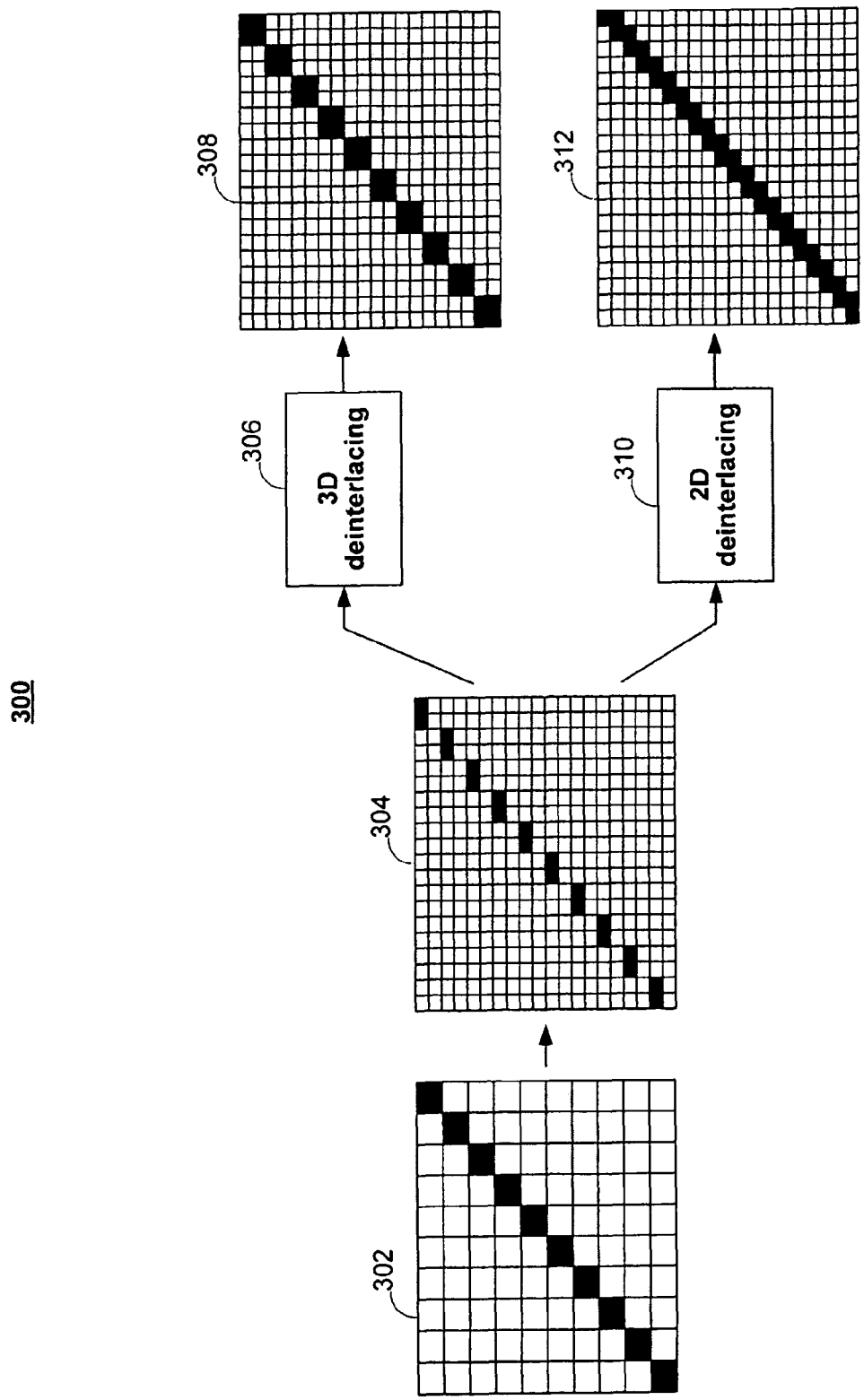
FIG. 3 illustrates the difference between 2-dimensional (2D) and 3-dimensional (3D) deinterlacing.

FIG. 3 illustrates one adverse affect that may result from using the 3D deinterlacing circuitry of display device 104 for a low-resolution video provided by, for example, portable media device 208. Portable media device 208 may store and display videos that have a low resolution such as 320×240. One frame (or two combined fields) of a 320×240 still video is represented by image/frame 302, where each square represents a pixel. That is, image 302 represents a series of unchanging images in a video, such that the resulting video is unmoving for a period of time. In the event that a user wants to watch a video stored in portable media device 208 on another display device (e.g., display device 104), the video content may be transmitted as a video signal through link 214. In some embodiments, the transmitted video signal is of a standard format that requires the video signal to be transmitted at a higher resolution (e.g., 640×480). Thus, portable media device 208 may simply increase (e.g., double) the number of lines and the number of pixels in each line. Image 304 represents the odd field of image 302 after conversion to 640×480. The even field is the same as the odd field. Clearly, image 304 does not have 640×480 resolution even though it is being transmitted as if it does. Processing circuitry 112 of display device 104, unaware of the origins of the video signal, may blindly apply 3D deinterlacing 306 as if the video were a true 640×480-resolution video. Processing circuitry 112, therefore, notices that the video is unchanging in successive time instances, and combines the odd and even fields. For a normal 640×480 video, the combination would produce a full, 640×480 resolution frame with complete information. 3D deinterlacing 306 for the 320×240 video transmitted as 640×480, however, produces image 308. Note that image 308 is not an improvement upon the original image 302, and if displayed on a larger scale, would be visibly jagged and blocky.

For a low resolution video transmitted with a higher resolution standard, 2D deinterlacing may produce results that have better visual quality. 2D deinterlacing does not utilize temporal information to interpolate, and instead interpolates unknown pixels based on surrounding, known pixels. This form of deinterlacing may be more appropriate for the 320× 240 video transmitted at 640×480, since no information is gained from combining the odd and even field. In some embodiments, 2D deinterlacing may involve vector interpolation, where edges in each image (e.g., the outline of objects, etc.) are determined, the angles of the edges are calculated, and unknown pixels are interpolated from neighboring pixels lying along the calculated edge angles. Performing 2D deinterlacing 310 on field 304 with vector interpolation may result in image 312. Image 312 may be an improvement over image 308, because the jagged and blocky edges have been visibly smoothened. Vector interpolation and its functionalities are described in greater detail in Sahu et al. U.S. patent application Ser. No. 11/294,709, which is hereby incorporated by reference herein in its entirety.

Similarly, frame rate conversion circuitry in processing circuitry 112 may worsen the appearance of video with a low frame rate. Processing circuitry 112, may select a frame rate conversion technique that is suitable for a video with a standard, higher frame rate (e.g., 60 fps). However, for video content converted to a lower frame rate (e.g., 15 fps) or video content captured at a lower frame rate, the technique used by processing circuitry 112 to increase the frame rate may not be appropriate. For example, portable media device 208 may capture video content at 15 fps, and may transmit the video at 30 fps by duplicating each frame to conform to a video standard. Processing circuitry 112 may treat the received video as a true 30 fps video and may perform frame rate conversion accordingly. Because the video is not truly at the frame rate expected by the processing circuitry, the conversion technique performed by processing circuitry 112 may not be effective, or may worsen the appearance of the displayed video content.

Therefore, to improve the presentation of low-resolution, low frame rate, and/or low-quality videos, the video signals corresponding to low-resolution videos may be processed prior to reception by processing circuitry 112 (FIG. 1). Instead of directly feeding a video signal from a video providing device to display device 104, as shown in FIGS. 1 and 2, the video signal may first be processed by a video format converter to convert the video content to content that is more appropriate for processing by processing circuitry 112 in the display device. In some embodiments, the video format converter may be embedded in a device external to both the video providing device and the display device. FIG. 4 shows illustrative system 400 that utilizes such an external device, e.g., dock 408. Low-resolution and/or low frame rate video content may be provided by portable media device 208, which is one type of video providing device 102. Portable media device 208 may be coupled to dock 408 in any suitable way and using any suitable orientation. For example, portable media device 208 may sit on top of dock 408, or portable media device 208 may be placed next to, inside, or under dock 408. In some embodiments, portable media device 208 may need to touch dock 408 in order to form link 214 between portable media device 208 and the embedded video format converter. In other embodiments, link 214 may include another coupling device (e.g., a wire). The low-resolution and/or low frame rate video content may be stored in storage 402 within the portable media device. The video content may have been captured from video capturing circuitry 401 or obtained from any other suitable source. Processing circuitry 404 may convert the stored video content into video signals using any of the techniques described in connection with processing circuitry 108 in FIG. 1. The video signals may be transmitted to dock 408 through link 214. Converter 410 may convert video signals from link 214 to video signals outputted to link 412 that, when displayed on display device 104, will be more visually pleasing than if the converter were not used (e.g., system 100 in FIG. 1). The converted video signal may be of any suitable format (e.g., composite, component, HD, etc.), which may or may not be in the same format as the video signal provided by portable media device 208.

Figure 5:
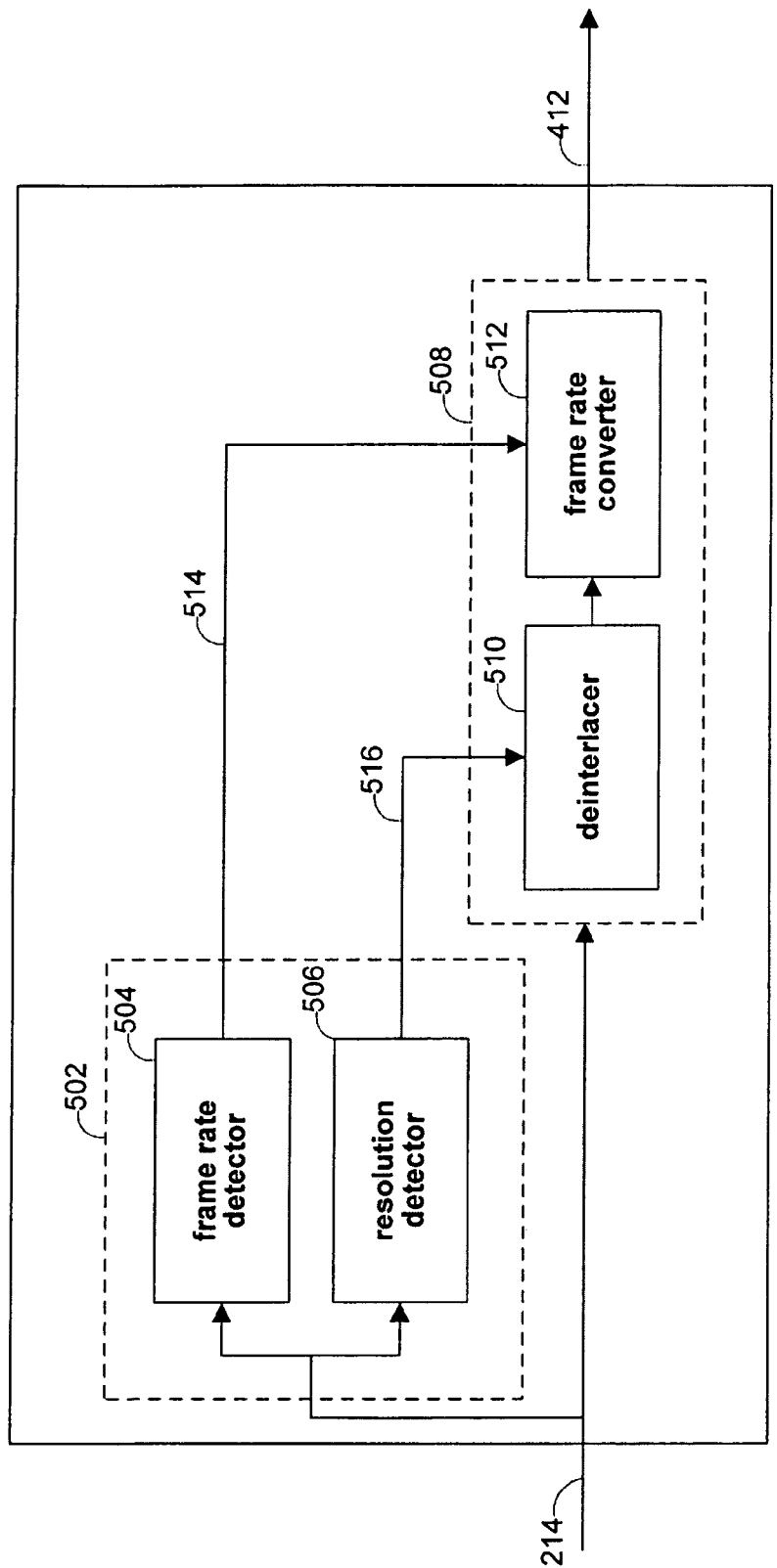
FIG. 5 shows an illustrative video format converter.

FIG. 5 shows a more detailed view of one embodiment of video format converter 410 that includes detector 502, video signal processor 508. Detector 502 may detect any suitable video characteristics of a video signal received from link 110. Detector 502 may include frame rate detector 504 and resolution detector 506, or any other suitable detector (e.g., for detecting encoding quality, etc.). Although detectors 504 and 506 are shown as separate blocks, both functions may be performed by a single block. Frame rate detector 504 and resolution detector 506 may detect the true frame rate and the true resolution, respectively, of a video signal received from link 214. Detectors 504 and 506 may transmit information related to the true frame rate and true resolution to processing block 508 via links 514 and 516. Detectors 504 and 506 may provide the actual values of the frame rate/resolution, a ratio of the transmitted value to the actual value, a determination based on the true frame rate/resolution of whether to process the received video signal, or any other suitable information about the received video signal. If the detectors transmit determinations of whether to process the video signal, detector 502 may additionally determine whether the true resolution and frame rate are below predetermined thresholds. The predetermined threshold may be set by a user or be hard-coded/hard-wired into detector 502. Therefore, if a 320×240 video is transmitted as 640×240, resolution detector 506 may output the value 320×240, a ratio of 0.5, a YES signal for predetermined threshold of 320×240, or a suitable value of any other format.

Video signal processor 508 may process a video signal received from link 214. Video signal processor 508 may include deinterlacer 510 and frame rate converter 512. As shown in FIG. 5, a received video signal may be processed by deinterlacer 510 and then by frame rate converter 512 before being transmitted to a display device via link 412. It should be understood, however, that frame rate conversion may be performed prior to deinterlacing, or the steps taken by the two blocks may be interleaved or integrated. In fact, the two steps may be performed by a single integrated component or block. Other modules may be implemented in signal processor 508 that may perform other video signal processing functions, such as scaling, video enhancement, etc. Also, deinterlacer 510 and frame rate converter 512 may perform processing functions other than deinterlacing and frame rate conversion, respectively. In some embodiments of video converter 410, one or both of deinterlacer 510 and frame rate converter 512 may be replaced by different processing functions.

With continuing reference to FIG. 5, video format converter 410 may convert composite video or S-Video outputs on link 214, or any other interlaced video formats the portable media device may support, into a progressive format at link 412, such as HDMI. Thus, to aid in the conversion to a progressive format, deinterlacer 510 may deinterlace the interlaced video signal. Deinterlacer 510 may selectively operate on the video signal based on information provided by detector 502. For example, if resolution detector 506 determines that the resolution of a video signal transmitted at 640×480 is actually 320×240, deinterlacer 510 may deinterlace the video signal using a suitable technique. On the other hand, if the detected resolution is 640×480, deinterlacer 510 may not operate on the video signal, and may allow the processing circuitry of the display device to perform the deinterlacing. If it is determined that deinterlacer 510 should deinterlace the received video signal, deinterlacer 510 may choose a particular processing technique based on information provided by resolution detector 506. For the example discussed above in connection with FIG. 3, deinterlacer 510 may deinterlace the video signal using 2D rather than 3D deinterlacing. Therefore, because the video is transmitted to display device 104 using a progressive format, the potentially unsuitable deinterlacing circuitry of display device 104 can be avoided.

In addition to deinterlacing the video signal, frame rate converter 512 may also aid in converting a received video signal from one format to another by adjusting the frame rate accordingly. Frame rate converter 512 may selectively operate on the video signal based on information provided by detector 502. For example, if frame rate detector 504 determines that the frame rate of a video signal transmitted at 30 fps is actually 15 fps, frame rate converter 512 may convert the video signal to a video that is actually 30 fps using a suitable technique. On the other hand, if the detected frame rate is 30 fps, frame rate converter 512 may not operate on the video signal. If it is determined that frame rate converter 512 should convert the received video signal, frame rate converter 512 may select a particular frame rate conversion technique based on the information provided by detector 502. Frame rate converter 512 may use motion-compensated frame rate conversion or any other suitable technique. A motion-compensated frame rate converter determines motion of objects in a video, and adds intermediate frames based on the knowledge of how the objects are moving. Motion-compensated frame rate conversion and its functionalities are described in greater detail in Biswas et al. U.S. patent application Ser. No. 11/803,535, which is hereby incorporated by reference herein in its entirety.

By processing a video signal using frame rate converter 512, video content may be captured at a low frame rate (e.g., 10 or 15 fps) or converted to low frame rate video, but may be displayed with fewer of the adverse effects typical of low frame rate video. In particular, frame rate converter 512 may produce a video that is more suitable for display on a display device than the video provided by a video providing device. In some embodiments, frame rate converter 512 may convert a low frame rate video into a video that can be displayed effectively on the display device without further frame rate conversion. For example, video content captured at 15 fps or 30 fps may be converted to 60 fps by frame rate converter 512 using a suitable frame rate conversion technique. Frame rate converter 512 may add new frames to the 15 fps and 30 fps video between existing frames using an approach that allows the new video to appear as if every frame (including each new frame) was actually captured by the video providing device, effectively creating a true 60 fps video that can be displayed on the display device. This video may be substantially more visually pleasing than a video with replicated frames that may have resulted had frame rate converter 512 not been used.

In other embodiments, frame rate converter 512 may convert a low frame rate video into a video with a frame rate that can be successfully processed by the display device. For example, rather than converting a video to 60 fps, frame rate converter 512 may convert a video at 15 fps to a video at 30 fps with the expectation that display device 104 will further convert the 30 fps video to 60 fps using a technique suitable for true 30 fps video content. In this scenario, since the 30 fps video provided by video format converter 410 may have the properties of true 30 fps video, the frame rate converter in display device 104 may be effective. Therefore, video capturing circuitry 401 may capture or convert to low-rate frames without sacrificing the look of having a high frame rate, and video content captured by the portable media device (or any other low frame rate video content) may be effectively displayed on a large-screen display device.

By utilizing a suitable deinterlacer and a suitable frame rate converter, video that has both low resolution and a low frame rate may be effectively displayed on display screen 114. The undesirable low resolution effects may be handled to some degree by deinterlacer 510, and the undesirable low frame rate effects may be handled to some degree by frame rate converter 512. Therefore, if video content is captured by video capturing circuitry 401 of the portable media device, the portable device may divide resources between obtaining a higher resolution or a higher frame rate according to the combined capabilities of the deinterlacer and the frame rate converter. That is, depending on the particular embodiments of the deinterlacer and the frame rate converter, the video format converter may be especially effective at processing video signals of some combinations of resolution and frame rates. Therefore, portable media device 208 may be designed such that it provides video content that is especially suited for the processing techniques performed by the video format converter. Alternatively, the video format converter may be designed such that it is especially suited to process the video signals provided by a particular media providing device.

In some embodiments, video format converter 410 of FIG. 5 may not include detector 502. In some embodiments, video format converter 410 may be designed to work with a particular type of video providing device (e.g., a portable media device of a specific brand), and may therefore expect a predetermined frame rate and resolution from link 214. In some embodiments, these predetermined video characteristics may not correspond to a particular transmission standard. For example, the video providing device may directly provide video content of 320×240 resolution, even though this may not be a standard transmission resolution. Because the video providing device and dock 408 can be designed to work with each other, the video providing can transmit a video signal using this or another non-standard, proprietary or semi-proprietary format. The dock, expecting this non-standard format, can process the non-standard video signal properly. Thus, the video providing device and dock 408 can include non-standard interface circuitry (not shown). In some embodiments, link 214 coupling the two devices may be also be a non-standard connector, cable, or other coupling device. It should be understood this technique of using a proprietary or semi-proprietary format can be used for any reason, such as to reduce the amount of processing necessary in the video providing device and/or the dock. This technique can also be used for any type of video providing device, such as a cellular telephone or a portable music player.

It may be contemplated that video format converter 410 of FIG. 5 can include one of frame rate detector 504 and resolution detector 506. In these embodiments, video format converter 410 may expect either the frame rate or resolution to be constant or specified by the video transmission scheme, and may detect the other video characteristic. For the same or similar reasons, it may also be contemplated that video format converter 410 may include only one of deinterlacer 510 and frame rate converter 512. It should therefore be understood that video format converter 410 of FIG. 5 is merely illustrative.

Referring back to FIG. 4, dock 408 may additionally contain circuitry or functionalities other than video format converter 410. If link 214 is wireless, dock 408 may contain a network interface to receive and process a wireless video signal. In some embodiments, a received video signal may be in a compressed format (e.g., H.264, MPEG4, VC-1, MPEG2, etc.). Dock 408 may therefore include circuitry that decompresses the compressed video signal and provides the decompressed video signal to video converter 410. In some embodiments, dock 408 may support receiving multiple video formats using one link (e.g., one cable, a wireless link). Then, dock 408 may additionally include a multi-format decoder (not pictured). The multi-format decoder may preprocess a received video signal based on the format of the video. For example, decoding a video signal may involve decompressing a compressed video signal according to the type of compression used, as described above.

Other than processing a video signal supplied by a portable media device, in some embodiments, dock 408 (FIGS. 4 and 5) may additionally include power circuitry to supply power to the portable media device and charge the battery of the portable media device. Thus, in these embodiments, portable media device would not be drained of power while it is providing video content to the display device. This feature may be especially advantageous for portable media devices that have functionalities other than capturing and providing video content. For example, if portable media device 208 is a cellular telephone with video capturing capability, the telephone would still have sufficient power to receive and maintain phone calls after it is used to provide video to a display device (e.g., a television). Therefore, a user of the telephone would not need to worry about how long or how often the telephone is used to provide video. Also, dock 408 could function as a charging station even when the portable media device is not providing video to the display device.

In some embodiments, dock 408 in FIG. 4 is designed for a specific type of portable media device (e.g., a video MP3 player). For example, dock 408 may include an interface for coupling the portable media player to the device. This interface may be shaped to only accept input from one brand or one type of portable media device. Alternatively, the interface may include a proprietary connector. In other embodiments, the interface for dock 408 may support a set of portable media devices, a set of DVD players, a set of computer/laptop devices, or a set of any other type of video providing device. In still other embodiments, dock 408 may support a set of video providing devices (e.g., all video providing devices that provide NTSC, etc.). Thus, the invention described herein is not limited to a portable media device, but may be applied to any device that provides low-resolution and/or low frame rate video. It should therefore be understood that dock 408 can include any type of interface (e.g., physical connector, network, proprietary, etc.) for coupling an electronic device to the dock.

Furthermore, video format converter 410 (FIG. 4) and any other circuitry described in connection with dock 408 need not be embedded in a device that is external to a video providing device and a display device. In some embodiments, video format converter 410 may be part of processing circuitry 112 (FIG. 1) in display device 104. For example, video format converter 410 may be embedded within a television, and may selectively process received video signals based on the resolution, frame rate, and/or quality of the video. Alternatively, video format converter 410 may process all received video signals regardless of the video characteristics. In other embodiments, video format converter 410 may be part of the processing circuitry in a video providing device. For example, video format converter 410 may be embedded in a computer/laptop device, and may selectively process video signals prior to transmission based on the resolution, frame rate, and/or quality of the video. Alternatively, video format converter 410 may process all video signals prior to transmission regardless of the video characteristics. The video format converter embedded in a device may be enabled or disabled by a user (e.g., by pushing a button on a television remote, by selecting a setting on a computer, etc.).

Figure 6:
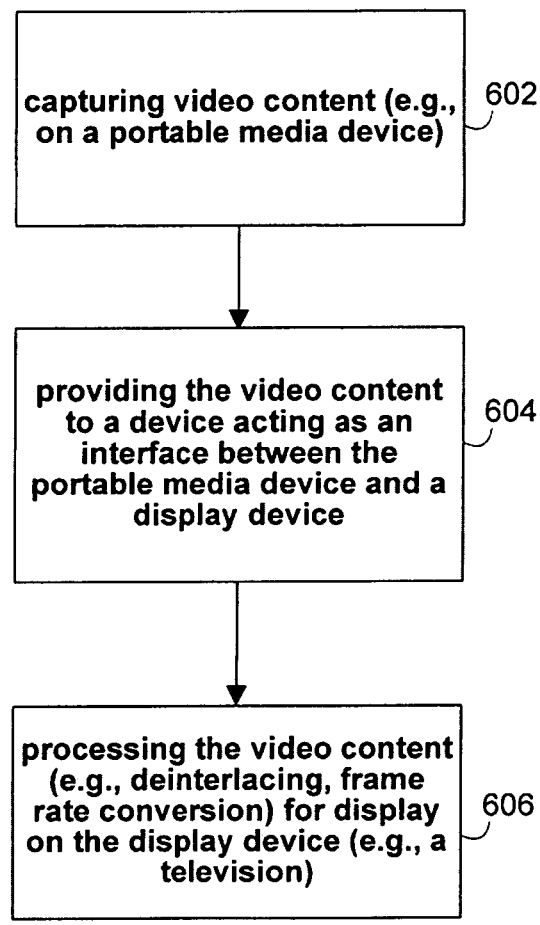
FIG. 6 shows an illustrative flow diagram for capturing and processing low frame rate and/or low resolution video content.

Referring now to FIG. 6, flow diagram 600 is shown for capturing and processing video content in accordance with an embodiment of the present invention. At step 602, video content is captured on a portable media device. The portable media device can be a cellular telephone, a portable music player, or any other suitable portable media device with video capturing capabilities (e.g., portable media device 208 of FIG. 2). The video content may be captured with any suitable video characteristics. In some embodiments, due to complexity or power constraints of the portable media device, the capturing capabilities of the portable media device may be limited. Thus, in some embodiments, the media device can dedicate substantially more of its resources to providing high-resolution video (e.g., 640×240, etc.), and may limit the frame rate of the video (e.g., 10 or 15 frames per second, etc.).

After capturing video content, the captured video content may be provided to a device acting as an interface between the portable media device and a display device. In some embodiments, this device acting as an interface can be adapted primarily for processing video signals from the portable media device. The interfacing device may be a docking station, such as dock 408 described above in connection with FIGS. 4 and 5. For convenience, it will be assumed that this interfacing device is a dock. Thus, the captured video content can be provided to a dock by coupling the portable electronic player to the dock (e.g., using link 214 of FIGS. 2-4). In some embodiments, the coupling may involve attaching a physical adapter or a connector between ports of the devices.

With continuing reference to FIG. 6, the video content can be provided to the dock (e.g., dock 408 of FIGS. 4-5) as a video signal using a standard transmission format (e.g., NTSC, etc.). In some embodiments, to provide a video signal using the resolution and frame rate of the transmission format, the portable media device may duplicate pixels and/or frames/fields to fake a standard video. In other embodiments of the present invention, video content can be provided at step 604 using a proprietary or semi-proprietary communications interface. In these embodiments, the portable media device and the dock may be designed to work together. Thus, the portable media device may transmit a video signal corresponding to the actual frame rate and resolution of the captured video content. For the example described above where only the frame is relatively low (e.g., 15 fps), video content may be provided using a standard transmissions standard with duplicated frames/fields, or the video content may be provided at the lower frame rate using a proprietary interface.

With continuing reference to FIG. 6, at step 606, the video content provided to the dock can be converted to content of higher resolution and/or frame rate. The conversion can be performed using techniques suitable for the actual resolution and actual frame rate of the captured video. Techniques for deinterlacing videos signals and performing frame rate conversion for low resolution and/or low frame rate video content are described below in connection with FIGS. 7-12. Thus, for the example where video content has only low frame rate, the dock can perform frame rate conversion to convert the actual frame rate of the video content to a higher frame rate (e.g., using the technique of flow diagram 900 or 1000). This higher frame rate may be the frame rate expected by a display device (e.g., a television), or it may be a frame rate that is suitable for display as video. Therefore, a video captured at a normal or high resolution, but at a low frame rate, may still be able to be displayed appropriately using the techniques described above.

Therefore, as illustrated by flow diagram 600 of FIG. 6, in some embodiments of the present invention, a dock (e.g., dock 408 of FIG. 4) can convert a video signal provided by a portable media device using a proprietary interface to a video signal recognizable by a display device (e.g., a television). In this way, the dock may act as an adapter between the portable media device and the display device. This may be an advantageous arrangement for portable media devices, as a proprietary interface may simplify circuitry in the portable device. Moreover, not only can the dock provide this video signal to a display device using an appropriate format, the dock can improve the frame rate and/or resolution, as well as perform any other functions, for improving the appearance of the video content on the display device. Even if the portable media device uses a standard transmission format (e.g., NTSC, etc.) recognizable by a display device, the improvement in video presentation on the display device may be highly desirable.

Also, as illustrated by flow diagram 600, content provided by a portable media device with limited video capturing and encoding capabilities may still be displayed effectively on a display device (e.g., a television). For the example described above, the portable media device can devote more of its processing power to providing high-resolution video, but at a low frame rate. If displayed directly, this video may appear to a user to be a distinct sequence of images. However, by using a docking station with a frame rate converter (e.g., dock 408 of FIG. 4), the frame rate of the high-resolution video can be increased effectively, thereby allowing the video content to be displayed on the display device as true video. This may be advantageous for portable media devices, because using this technique, the limited capturing/encoding capabilities of these portable media devices may not limit their ability to provide content for display on a larger screen device. Although this example is directed to video content of high resolution and low frame rate, it should be understood that the present invention also applies to low resolution/high frame rate and low resolution/low frame rate scenarios.

Figure 7:
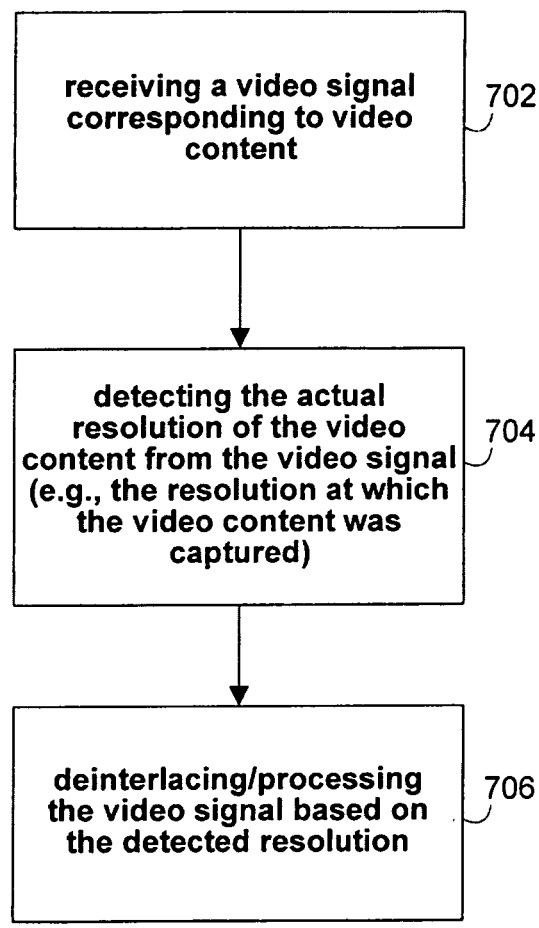
FIGS. 7-8 are illustrative flow diagrams for processing a low-resolution video signal.

Flow diagram 700 in FIG. 7 shows illustrative steps that video format converter 410 (FIGS. 4 and 5) may take to deinterlace and process a video signal. Video converter 410 receives a video signal corresponding to video content at step 702. The video content may be content captured by a portable media device (e.g., a cellular telephone). The video signal may be of any suitable format, and may correspond to a transmission standard. At step 704, video converter 410 may detect the resolution of the video content from the video signal, which may be the resolution at which the video content was captured. In some embodiments, video converter 410 may only take video input from a particular type or brand of a video providing device. For example, dock 408 (FIG. 4) may include an interface that is shaped to fit one type of device, dock 408 can include a proprietary or semi-proprietary interface, or video converter 410 may be embedded in a particular video providing device. In these embodiments, resolution detection at step 704 may be simpler, since the resolution may be hard-coded or hard-wired based on the known encoding of the video providing device. Further proprietary or other more advanced connections may include embedded resolution information. In some embodiments, and for certain types of products, the resolution information could also be provided in response to a user input, such as in response to the user explicitly selecting content of particular resolutions. For example, when downloading online content, one can often explicitly choose which resolution to download the online content. For the example discussed in connection with FIG. 3, video format converter 410 may be hard-wired or hard-coded to expect the resolution of every transmitted video to be 320×240, or equivalently, to expect the actual resolution to be half of the transmitted resolution.

In other embodiments of system 400 in FIG. 4, video format converter 410 may be used for a plurality of video providing devices. Therefore, the resolution or scaling factor of the video signal received at step 702 in flow diagram 700 (FIG. 6) may vary. In this case, resolution detection of the video content at step 704 is more complex. The video converter may, for example, have a front-end circuit that detects pixel replication in the video signal (e.g., resolution detector 506). The detector may compare vertically and/or horizontally neighboring pixels, or the detector may compare a number of surrounding pixels. The pixel radius, or a similar metric, that is used for a given comparison may be programmable. Furthermore, a threshold for the percentage of pixels that should match in order to form a confident determination of the resolution may also be programmable. For the example discussed above in connection with FIG. 3, video converter 410 may detect that the received 640×480 video signal actually has a resolution of 320×240. If a cell telephone with a resolution of 160×120 is coupled to video converter 410 instead, video converter 410 may detect the true resolution or detect that the true resolution is one-fourth of the transmitted resolution (assuming again that the transmitted resolution is 640×480).

At step 706 in FIG. 7, the received video signal may be deinterlaced. The video signal may be deinterlaced in its transmitted resolution regardless of any discrepancies between the transmitted and the actual resolution. However, the technique used to deinterlace the video signal may be selected based on the detected resolution. For the example as discussed in connection with FIG. 3, the transmitted, 640×480-resolution video may be directly deinterlaced by video converter 410, and 2D deinterlacing may be used because of the detected, 320×240 resolution. In other scenarios, deinterlacing may involve other forms of 2D deinterlacing, some form of 3D deinterlacing, or any other deinterlacing technique. An advanced form of 3D deinterlacing is discussed in greater detail in U.S. patent application Ser. No. 11/932,686, which is hereby incorporated by reference herein in its entirety.

Figure 11:
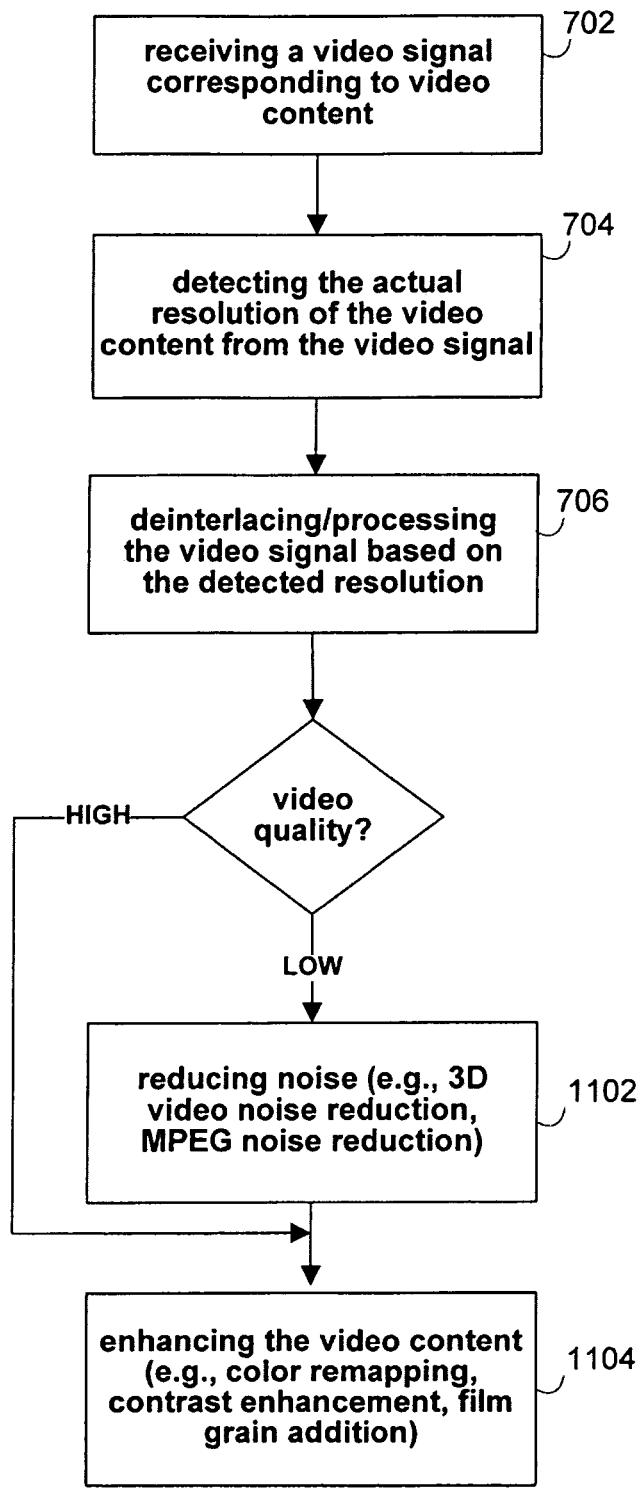
FIGS. 11-12 are illustrative flow diagrams for improving the visual quality of a low-resolution and/or low frame rate video.
Figure 12:
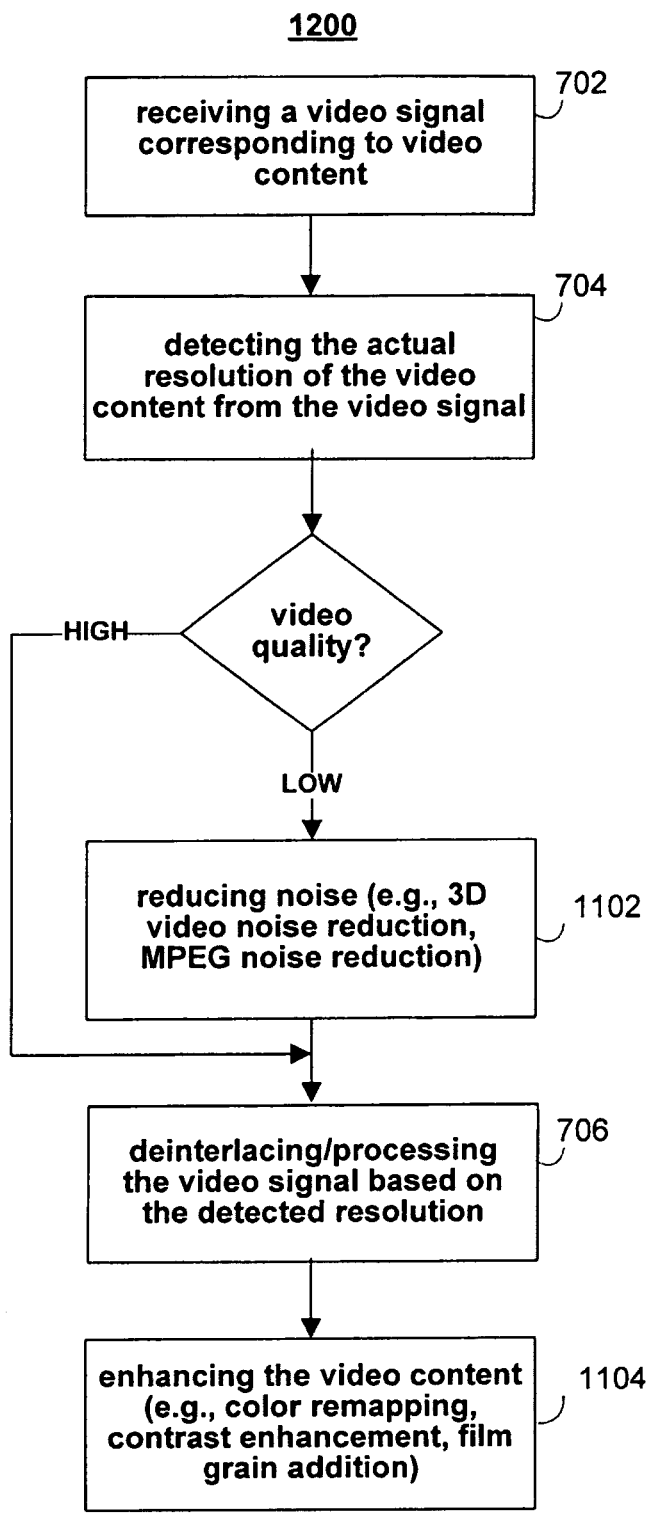

Deinterlacing at step 706 in FIG. 7 may additionally involve scaling the video to an image size suitable for display on a television or other large-screen display device (e.g., display device 104). For example, video converter 410 may scale a 640×480 video to the resolution of display screen 114, which, for example, may have a resolution of 1280×720 or 1920×1080. When a video signal is being converted from one standard to another (e.g., NTSC to HD), in addition to changing the resolution of the video signal, video converter 410 may adjust the frame rate in accordance with the specifications of the standards. In situations where the received video signal is already in a progressive format, video format converter 410 may not need to deinterlace the video signal, and may instead perform other processing steps, such as scaling the video and/or performing frame-rate conversion. For example, if the original content is determined to be progressive 320×240 at 30 frames per second, but display screen 114 is 1280×720 at 60 frames per second, converter 410 may be scale the video signal to 1280×720 using vector interpolation and convert it to 60 frames per second by repeating every frame once. Alternatively, frame-rate conversion by converter 410 may involve a more advanced form of frame-rate conversion, such as motion-compensated frame-rate conversion. Frame rate conversion, its functionalities, and more particular implementations will be discussed in more detail below in connection with FIGS. 9 and 10. In addition to or in place of the processing techniques described above, video converter 410 may process the video signal in other ways. Additional processing may include any of the techniques discussed below in connection with steps 1102 and 1104 in flow diagrams 1100 and 1200 (FIGS. 11 and 12). These techniques may be chosen based on the detected resolution of the video signal. In some embodiments, if the true resolution detected at step 704 is sufficiently high, video format converter 410 may not perform deinterlacing and/or any other processing techniques, and may instead allow the processing circuitry of a display device to perform any necessary processing.

Figure 8:
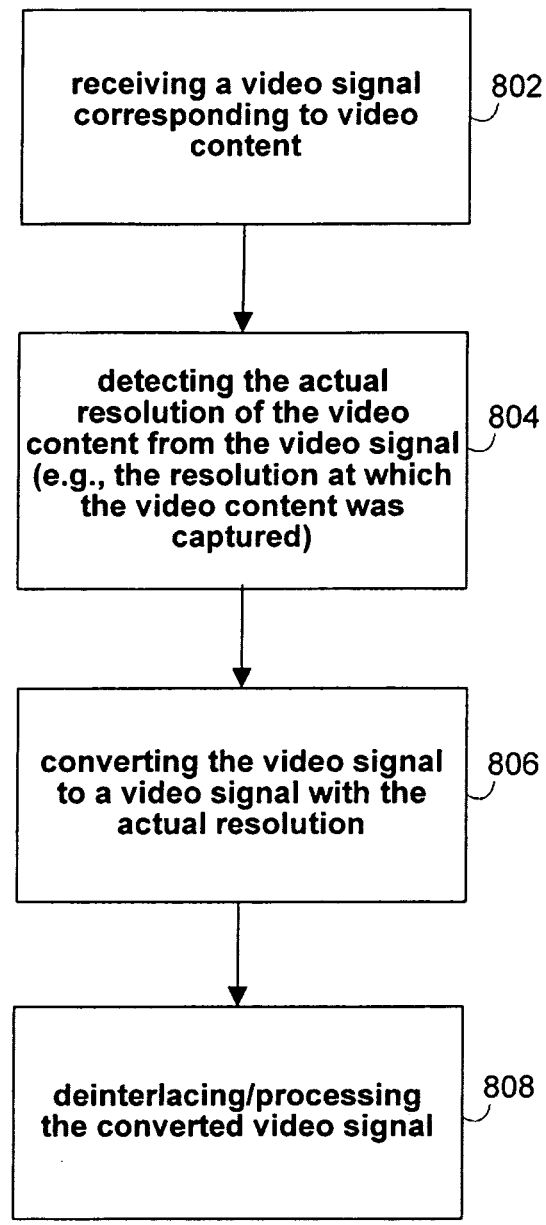

Flow diagram 800 in FIG. 8 shows alternative steps that may be taken by video format converter 410 (FIG. 4) to deinterlace and process a video signal. At step 802, a video signal corresponding to video content is received from a video providing device. The video signal may be of any suitable format. At step 804, the actual resolution of the video content is determined from the video signal. Detection or determination of the video resolution may occur using any of the techniques discussed in connection with step 704 of flow diagram 700 (FIG. 7). After determining the video resolution, video converter 410 may convert the video signal to video content with the actual resolution at step 806. For the example discussed in connection with FIG. 3, video converter 410 may revert the transmitted 640×480 video signal to a 320×240 video signal. Video converter 410 may undo any pixel replications performed by the video providing device, thereby recovering the resolution of the original video signal. Video converter 410 may ignore pixels that it determines are replications of other pixels, or video converter 410 may perform another processing technique that recovers a video signal with its true resolution. If, however, the video format converter determines that the transmitted resolution is substantially equal to the true resolution, the video format converter may not deinterlace the video signal, and may instead allow the display device to perform the deinterlacing.

After obtaining a video signal with its original resolution at step 806, video converter 410 (FIG. 4) may deinterlace and process the converted video signal at step 808. Since the video signal is in its proper resolution, a deinterlacer may choose a deinterlacing technique that is best suited for scaling a video from its original, true resolution (e.g., 320×240 for the image in FIG. 4) to the final resolution of a display screen (e.g., display screen 114). Deinterlacing at step 808 may involve any of the types of deinterlacing (e.g., 2D, 3D, etc.) discussed above in connection with step 706 of flow diagram 700 (FIG. 7). Additional processing may also be applied to the video signal, including any of the techniques discussed below in connection with steps 1102 and 1104 in flow diagrams 1100 and 1200 (FIGS. 11 and 12).

Figure 9:
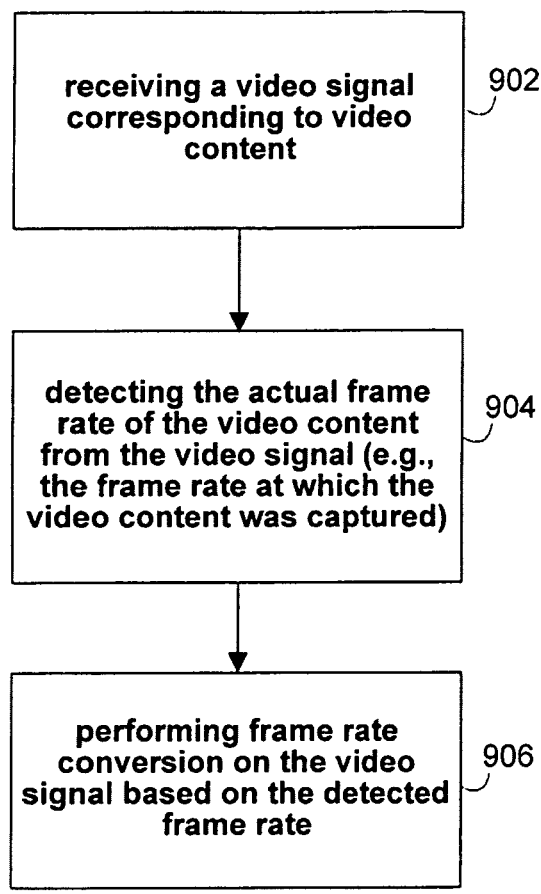
FIG. 9-10 are illustrative flow diagrams for processing a low frame rate video.

Flow diagram 900 in FIG. 9 shows illustrative steps that video format converter 410 (FIGS. 4 and 5) may take to perform frame rate conversion. At step 902, a video signal corresponding to video content may be received. The video content may have been captured from a portable media device (e.g., a cellular telephone, etc.), and the video signal may be of any suitable format. The frame rate of the associated video content may be detected or determined at step 904 (e.g., by frame rate detector 504 (FIG. 5)). Thus, in some embodiments, this determination may reveal the frame rate at which the video content was originally captured. In some embodiments, the determination may involve determining the frame rate of the video transmission standard used by the video signal. In some cases, the determination may be relatively simple if dock 408 is designed for a single type of player that always provides video content with a given frame rate. In other cases, the determination may involve determining whether the video signal has repeated frames. For example, if the video content has a frame rate of 15 fps but is transmitted using a video transmission standard for 30 fps, processing circuitry 108 may have faked a 30 fps resolution by doubling every true frame. Accordingly, the video converter may determine that the true frame rate of the video content is 15 fps. Detecting repeated frames may involve comparing pixels at equivalent or surrounding locations in successive frames. A threshold for the percentage of pixels that should match in order to form a confident determination of the true frame rate may be hard-coded/hard-wired, or may be programmable. The number of successive frames that are used for each comparison may also be hard-wired/hard-coded or programmable. The video converter may further determine whether the true frame rate of the video content is below a given predetermined threshold. The predetermined threshold may be programmable by a user or may be hard-coded or hard-wired. In some embodiments, the frame-rate detection may use "frame motion" techniques similar to the ones used in the Film Cadence Handler (FCH) that is part of the advanced 3D deinterlacer described in the above-incorporated patent application Ser. No. 11/932,686.

Following detection or determination of the frame rate, the video converter may perform frame rate conversion at step 906 (e.g., by frame rate converter 512 (FIG. 5)) based on the detected frame rate. Frame rate conversion may involve motion-compensated frame rate conversion, discussed above in connection with frame rate converter 512 in FIG. 5, or frame rate conversion may involve any other suitable technique for adjusting the frame rate. In some embodiments, the video converter may bypass this step if the frame rate is not sufficiently low (e.g., if the frame rate is above the given threshold), and may allow the frame rate conversion circuitry of the display device, if present, to perform any suitable frame rate conversion.

In some embodiments, frame rate conversion at step 906 may involve converting the video signal to a video signal with a frame rate higher than both the actual frame rate and the transmitted frame rate. For example, if the actual and transmitted frame rate are 15 fps and 30 fps, respectively, the video signal may be converted to 60 fps at step 906. The converted video signal may then be outputted using a different video transmission standard than the video transmission standard of the received video signal. Frame rate conversion may involve performing frame rate conversion using all of the frames of the received video signal, regardless of whether the frames are merely repetitions of other frames or obtained using some other technique. Any interpolated frames may be determined based only on true frames of the video signal or based on any surrounding frames in the video signal. The type of conversion performed may be selected based on the actual frame rate determined at step 904, and may vary depending on whether conversion is performed on only the true frames or on all the frames of the received video signal.

Figure 10:
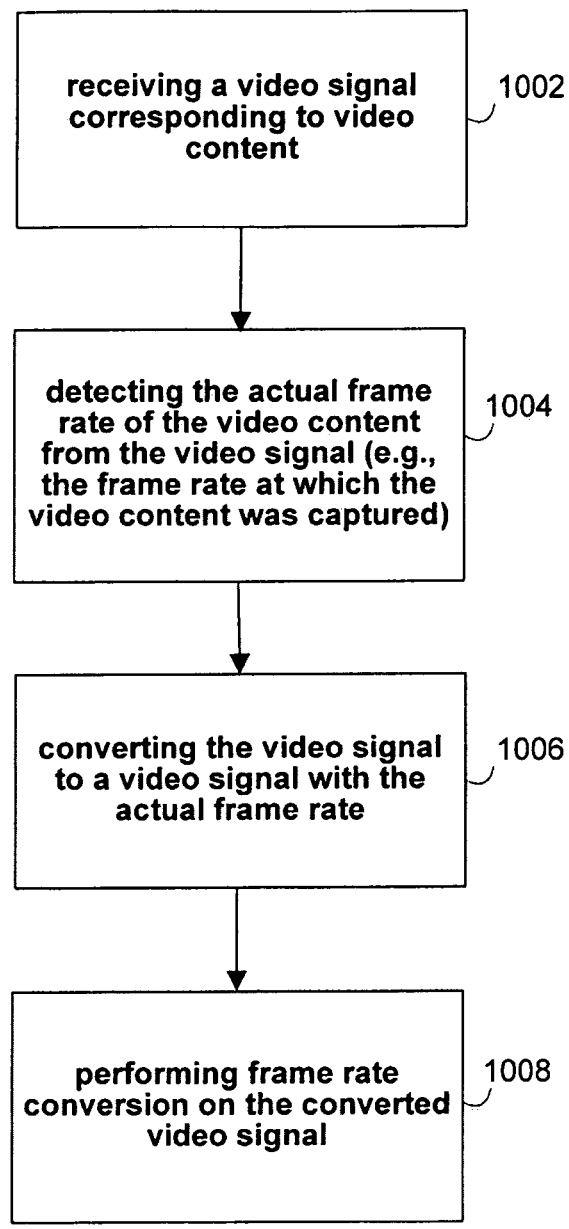

Referring now to FIG. 10, another illustrative flow diagram is shown for converting the frame rate of low frame rate video content in accordance with an embodiment of the present invention. At steps 1002 and 1004, a video signal corresponding to video content is received and the actual frame rate of the video content is detected. The video signal can be received and the frame rate can be detected using any of the techniques described above in connection with steps 902 and 904 of flow diagram 900 (FIG. 9), respectively. At step 1006, the video signal can be converted to a video signal/content with the actual resolution detected at step 1002. The video signal can be converted to its true resolution by ignoring or removing any redundant frames, or using any other suitable technique. Thus, the original frame rate of the video content can be recovered from the received video signal.

With continuing reference to FIG. 10, frame rate conversion can be performed on the converted video signal at step 1008. In some embodiments, if the true frame rate (e.g., 15 fps) is lower than transmitted frame rate (e.g., 30 fps), frame rate conversion may involve converting the actual frame rate to the transmitted frame rate (e.g., converting the 15 fps video to a video that is actually 30 fps). Therefore, the converted video signal may be in the same transmission format as the received video signal. To convert the actual frame rate to the transmitted frame rate, The video signal with the actual frame rate may be converted to a video signal with the transmitted frame rate using any suitable frame rate conversion technique (e.g., motion-compensated frame rate conversion). The type of frame rate conversion used may depend on the actual frame rate and/or the transmitted frame rate. In other embodiments, and as described above, frame rate conversion at step 1008 may involve converting the video signal to a video signal with a frame rate higher than both the actual frame rate and the transmitted frame rate. Thus, the technique for performing frame rate conversion at step 1008 may involve choosing a technique appropriate for converting the frame of the video signal from its actual frame rate to the final frame rate. Any other frame rate conversion technique described above in connection with step 906 of flow diagram 900 can also be used at step 1008.

FIGS. 11 and 12 show illustrative flow diagrams 1100 and 1200 for improving the appearance of a low-resolution video on a large-screen display. Referring first to FIG. 11, additional processing steps are performed following deinterlacing at step 706. Although flow diagram 1100 shows deinterlacing using the steps from flow diagram 700 (FIG. 7), the steps in flow diagram 800 (FIG. 8) may be used instead (e.g., by replacing steps 702 through 706 in FIG. 11 with steps 802 through 808). Flow diagram 1100 may additionally be modified to also improve the appearance of low frame rate video. For example, steps 904 and 906 of FIG. 9 or steps 1004 through 1008 of FIG. 10 may be added to flow diagram 900 at any location after step 702. Alternatively, flow diagram 1100 may be modified to improve the appearance of high resolution and low frame rate video by replacing steps 704 and 706 with steps 904 and 906 or steps 1004 through 1008. In additional to deinterlacing and/or performing frame rate conversion, the particular processing techniques that are performed on a video may depend on whether the video is high-quality (e.g., professionally-generated, low-resolution video on the Internet, videos from portable media device 208, etc.) or low-quality (e.g., amateur-generated videos on the Internet, highly compressed videos, etc.). The quality of a video may be determined in any suitable way. The quality may be hard-coded or hard-wired if, for example, dock 408 takes input from only one type of video providing device, and the video-providing device typically provides substantially the same quality video. Alternatively, a suitable metric for assessing the quality of a video may be determined. The video may be considered high-quality if the calculated metric is higher than a certain threshold.

Low-quality videos may suffer from artifacts such as blocking artifacts and mosquito noise. Blocking artifacts refer to the blocky appearance of a low resolution video that is typically seen on areas of less detail in the image. Mosquito noise is a ringing effect, caused by truncating high-frequency luminance and/or chrominance coefficients, typically seen around sharp edges in the video. These and other artifacts may be caused from amateur recording and/or encoding techniques (e.g., using non-ideal compression settings, holding a hand-held camera instead of using a tripod, etc.).

For low-quality videos, the compression artifacts may be reduced at step 1102 (e.g., by converter 410 in FIGS. 4 and 5). Artifact reduction at step 1102 may involve reducing one or more types of artifacts (e.g., mosquito noise, blocking artifacts, etc.). Artifacts may be reduced using one or more hardware-based or software-based modules. One or more types of artifacts may be reduced by combining different noise-reducing techniques into a single module, by cascading various noise-reducing modules, or using any other suitable technique. In some embodiments, block and mosquito noise reduction may be used at step 1102. This can be referred to as "MPEG noise reduction," but its application is useful for any compression scheme based on a discrete cosine transform (DCT), including H.264, VC-1, MPEG4, and MPEG2. In some embodiments, 3D video noise reduction may be used to reduce both temporal and spatial noise. The amount of noise reduction performed at step 1102 (e.g., the number of noise reducing techniques used, the degree to which each technique is used, etc.) may depend on the assessment of the quality of the video. MPEG noise reduction and 3D video noise reduction are described in greater detail in Pathak U.S. patent application Ser. No. 11/521,927 and Pathak et al. U.S. patent application Ser. No. 11/400,505, respectively, which are hereby incorporated by reference herein in their entirety. Each disclosure also describes a way to assess the quality of the video. The former has a blockiness and mosquito noise measurement, and the latter has automatic noise estimation. Either, both, or any other suitable measurement may be used to determine whether a video high- or low-quality and/or to determine the amount of noise reduction necessary.

As described above, prior to noise reduction at step 1102 (FIG. 11), the video signal may include true information about the video content as well as noise. Because of the poor quality of the video signal, a disproportionate amount of the video information in the signal may be noise information rather than true video information. Thus, after this noise is reduced at step 1102, a disproportionate amount of the original information may be reduced or even completely removed. Thus, displaying only the remaining information may not create a pleasant picture, as there may be very little detail. In particular, there may be less actual video data than if the video were captured using high-quality techniques. For example, a low-quality video that was taken by a hand-held camera may have a moving picture caused by a shaking camera, even if the background or other parts of the picture are substantially unmoving for successive images. Thus, when the video is compressed, inter-frame compression techniques that would otherwise notice that the fields/frames are unchanging may not be as effective. For a given data rate or file size, extra bits are used to capture the shaking "noise," leaving fewer bits for detail and other actual information. Noise reduction may reduce the noise caused by the shaking camera, effectively reducing or removing information from the video signal. Thus, if the remaining information is displayed to a user, there may not be enough video information to create a pleasing display. For example, the resulting video may have blurred edges, since the original edges were noisy and removed. Similarly, the resulting video may have low contrast. In general, once artifacts are removed from noisy areas of the picture, there may be very little detail left in those areas.

Accordingly, following noise reduction at step 1102, the video signal is enhanced at step 1104 (e.g., by converter 410 in FIGS. 4 and 5). Video enhancement at step 1104 may involve enhancing different aspects of the video (e.g., the edges, the color/light contrasts, etc.). Video enhancement may occur using one or more hardware-based or software-based modules. One or more aspects of the video may be enhanced by combining different video-enhancing techniques into a single module, by cascading various video-enhancing modules, or using any other suitable technique. In some embodiments, video enhancement may involve color remapping. That is, certain colors in a video may be mapped into other shades or other colors. For example, certain shades of green that typically correspond to the color of grass may be remapped to a more vibrant, healthier-looking shade of green. In some embodiments, video enhancement may involve changing the contrast of colors or light. For example, to make a picture more vivid, a video processor may increase the lighting contrast. Color remapping and video contrast enhancement, and their functionalities, are discussed in greater detail in Srinivasan et al. U.S. patent application Ser. No. 11/296,163 and Srinivasan et al. U.S. patent application Ser. No. 11/295,750, respectively, which are hereby incorporated by reference herein in their entirety.

With continuing reference to FIG. 11, video enhancement at step 1104 may involve adding film grain. Film grain is a high-frequency noise that is naturally present in film, but not in digital video. It is referred to herein as a noise source of any distribution and magnitude that may be added to a video signal. Typically, film grain is generated by a film grain generator and added to high-definition digital video. Film grain on high-definition, digital video is used to create a softer, creamier feeling in the picture that is characteristic of film. This is often accomplished by adding a spatio-temporal noise pattern, a particularly effective way to create "perceptual masking," which involves the reduction of visual acuity. For low-resolution video, on the other hand, the addition of film grain may establish the look of texture in a blurred image. Adding film grain may create the illusion that there is detail in the picture, even though, due to low resolution and noise reduction at step 1102, there actually may be very little detail. Film grain may be added to cover up remaining artifacts or other areas of poor visual quality. For example, if a noise pattern with high spatio-temporal frequencies is used, "perceptual masking" may cause viewers to be less aware or bothered by the remaining artifacts. Film grain generation and addition, and its functionalities, are discussed in greater detail in Balram et al. U.S. patent application Ser. No. 11/313,577, which is hereby incorporated by reference herein in its entirety.

Videos that are high-quality but low-resolution (e.g., professional-generated videos from the Internet) may also be enhanced according to the techniques described above in connection with step 1104. Step 1102 may often be skipped, because professionally-generated videos typically do not suffer from substantial compression artifacts. The above-described techniques for video enhancement, or any other suitable technique, may be used to cover up deficiencies, to simulate detail, to smoothen blocky areas, to add contrast to the picture, or to provide any other enhancement that may increase the viewing pleasure of a low-resolution video (e.g., 320×240 video from portable media device 208) on a large-screen display (e.g., display screen 114 with 1280×720 resolution).

Referring now to FIG. 12, illustrative flow diagram 1200 shows an alternative embodiment for improving the visual quality of a video. Note that the steps in flow diagram 1200 are the same as those in flow diagram 1100 (FIG. 11), but arranged in a different order. As discussed above in connection with FIG. 11, steps from FIG. 9 or 10 for performing frame rate conversion may be added at any appropriate location in flow diagram 1200, or, where appropriate, may replace any of the deinterlacing steps (that is, step 702, 704, and 706). Although flow diagram 1200 shows deinterlacing using the steps from flow diagram 700 (FIG. 7), the steps in flow diagram 800 (FIG. 8) may be used instead (e.g., by replacing steps 702 and 704 with steps 802 through 806 and step 706 with step 808). Flow diagram 1200 shows that deinterlacing does not necessarily occur before the additional processing steps. In particular, deinterlacing step 706 is shown in flow diagram 1200 to occur between processing steps 1102 and 1104. However, it should be understood that deinterlacing may be performed at any time relative each noise reduction and video enhancement technique associated with steps 1102 and 1104. That is, flow diagram 1200 may be altered such that any of the noise reduction techniques associated with step 1102 may be performed at the same time or after deinterlacing (for poorly or overly compressed videos), and any of the video enhancement techniques associated with step 1104 may be performed at the same time or prior to deinterlacing. Thus, deinterlacing step 706 may also follow processing step 1104. Similarly, if frame rate conversion is performed, step 1102 may be performed at the same time or after frame rate conversion, and any of the video enhancement techniques associated with step 1104 may be performed at the same time or prior to frame rate conversion.

Referring now to FIGS. 13A-13G, various exemplary implementations of the present invention are shown.

Figure 13A:
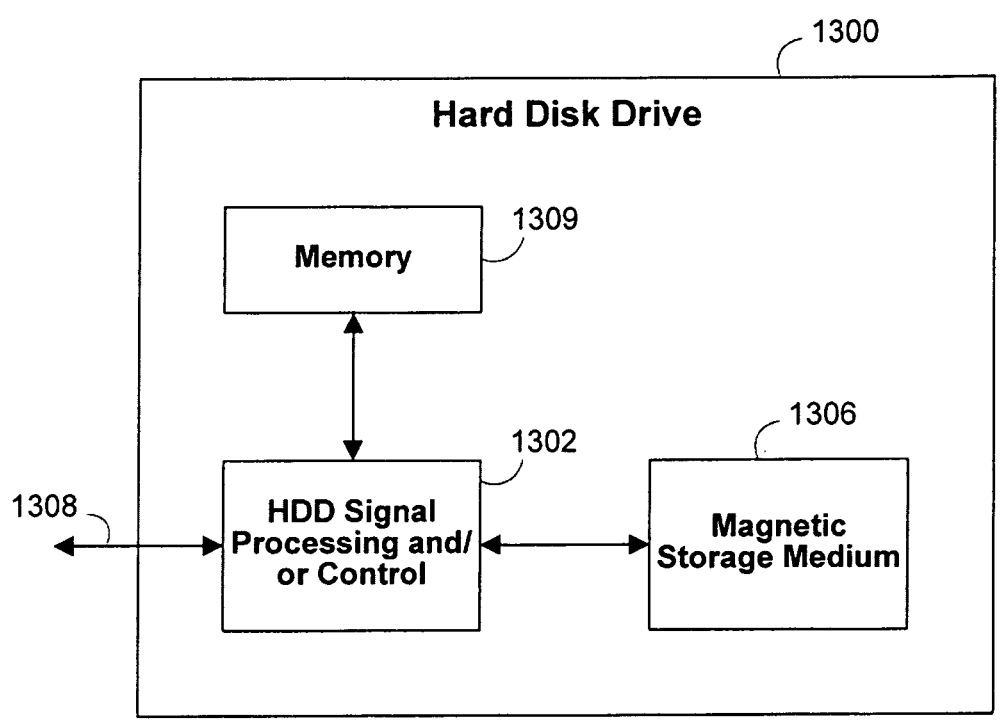
FIG. 13A is a block diagram of an exemplary hard disk drive that can employ the disclosed technology.

Referring now to FIG. 13A, the present invention can be implemented in a hard disk drive 1300. The present invention may be implemented as part of either or both signal processing and/or control circuits, which are generally identified in FIG. 13A at 1302. In some implementations, the signal processing and/or control circuit 1302 and/or other circuits (not shown) in the HDD 1300 may process data, perform coding and/or encryption, perform calculations, and/or format data that is output to and/or received from a magnetic storage medium 1306.

The HDD 1300 may communicate with a host device (not shown) such as a computer, mobile computing devices such as personal digital assistants, cellular telephones, media or MP3 players and the like, and/or other devices via one or more wired or wireless communication links 1308. The HDD 1300 may be connected to memory 1309 such as random access memory (RAM), nonvolatile memory such as flash memory, read only memory (ROM) and/or other suitable electronic data storage.

Figure 13B:
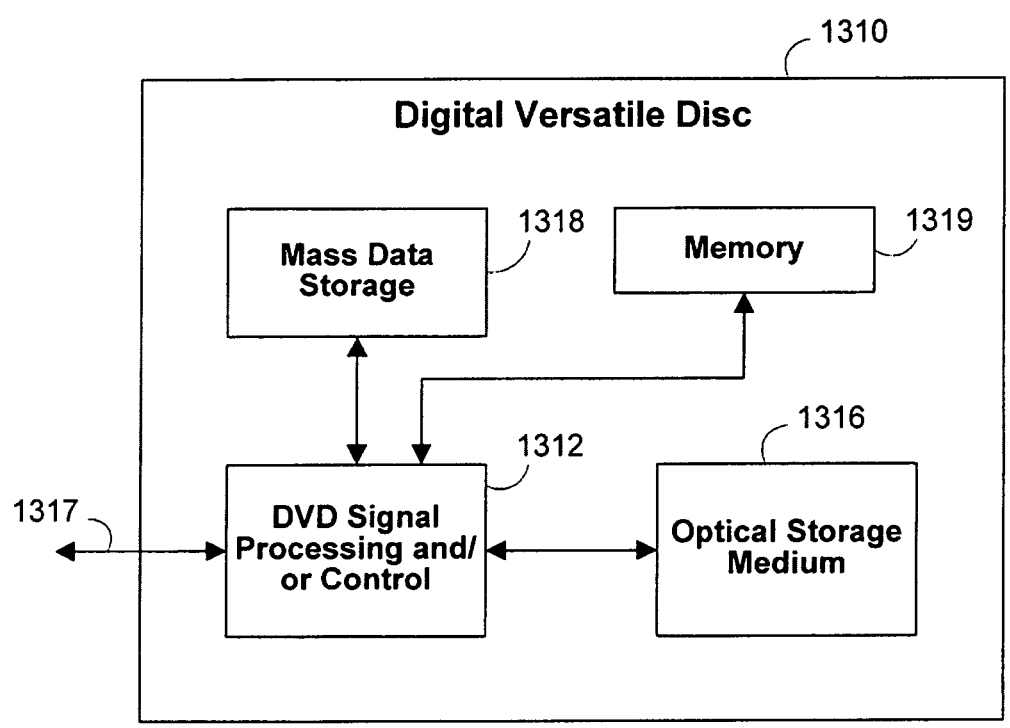
FIG. 13B is a block diagram of an exemplary digital versatile disc that can employ the disclosed technology.

Referring now to FIG. 13B, the present invention can be implemented in a digital versatile disc (DVD) drive 1310. The present invention may be implemented as part of either or both signal processing and/or control circuits, which are generally identified in FIG. 13B at 1312, and/or mass data storage 1318 of the DVD drive 1310. The signal processing and/or control circuit 1312 and/or other circuits (not shown) in the DVD drive 1310 may process data, perform coding and/or encryption, perform calculations, and/or format data that is read from and/or data written to an optical storage medium 1316. In some implementations, the signal processing and/or control circuit 1312 and/or other circuits (not shown) in the DVD drive 1310 can also perform other functions such as encoding and/or decoding and/or any other signal processing functions associated with a DVD drive.

The DVD drive 1310 may communicate with an output device (not shown) such as a computer, television or other device via one or more wired or wireless communication links 1317. The DVD drive 1310 may communicate with mass data storage 1318 that stores data in a nonvolatile manner. The mass data storage 1318 may include a hard disk drive (HDD). The HDD may have the configuration shown in FIG. 13A. The HDD may be a mini HDD that includes one or more platters having a diameter that is smaller than approximately 1.8". The DVD drive 1310 may be connected to memory 1319 such as RAM, ROM, nonvolatile memory such as flash memory and/or other suitable electronic data storage.

Figure 13C:
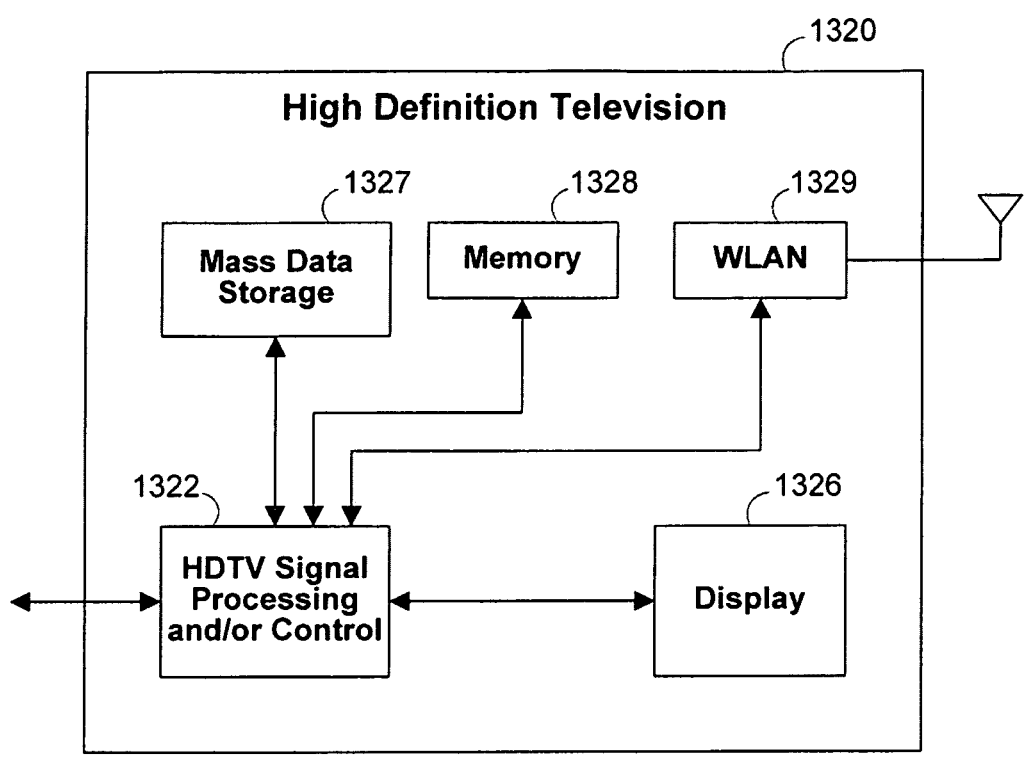
FIG. 13C is a block diagram of an exemplary high definition television that can employ the disclosed technology.

Referring now to FIG. 13C, the present invention can be implemented in a high definition television (HDTV) 1320. The present invention may be implemented as part of either or both signal processing and/or control circuits, which are generally identified in FIG. 13C at 1322, a WLAN interface 1329 and/or mass data storage 1327 of the HDTV 1320. The HDTV 1320 receives HDTV input signals in either a wired or wireless format and generates HDTV output signals for a display 1326. In some implementations, signal processing circuit and/or control circuit 1322 and/or other circuits (not shown) of the HDTV 1320 may process data, perform coding and/or encryption, perform calculations, format data and/or perform any other type of HDTV processing that may be required.

The HDTV 1320 may communicate with mass data storage 1327 that stores data in a nonvolatile manner such as optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". The HDTV 1320 may be connected to memory 1328 such as RAM, ROM, nonvolatile memory such as flash memory and/or other suitable electronic data storage. The HDTV 1320 also may support connections with a WLAN via a WLAN network interface 1329.

Figure 13D:
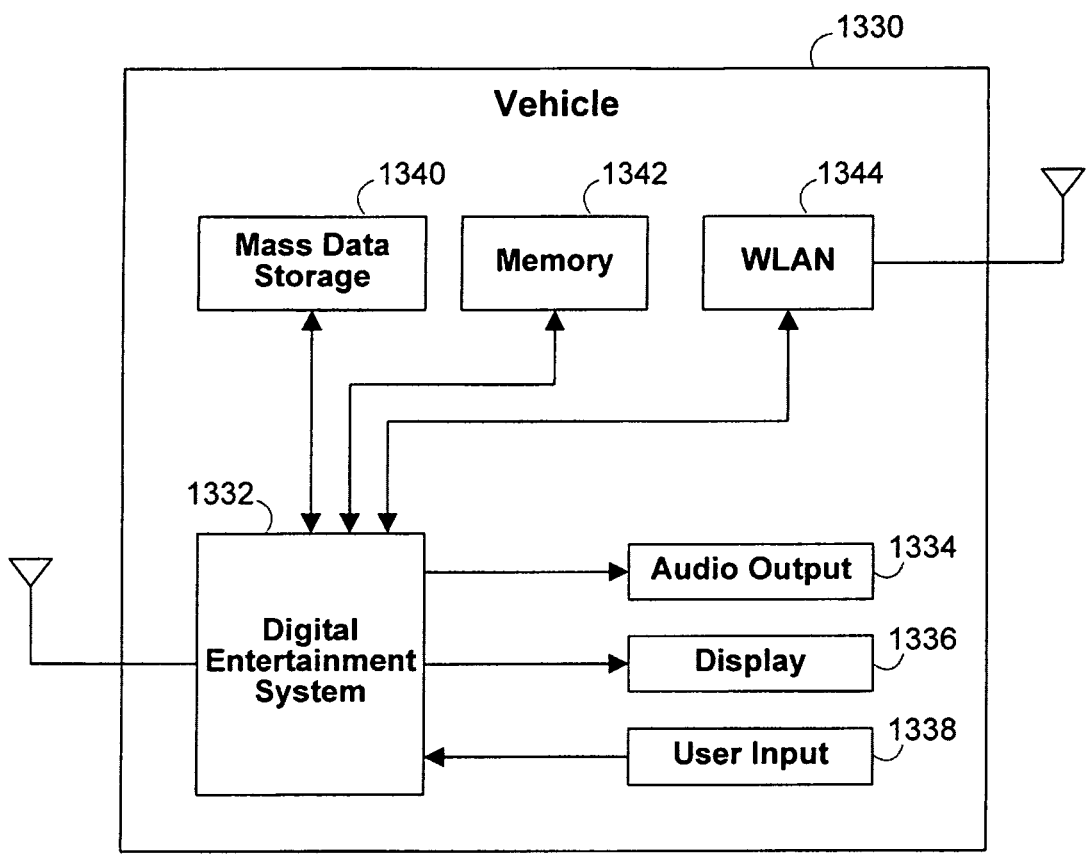
FIG. 13D is a block diagram of an exemplary vehicle that can employ the disclosed technology.
Figure 13E:
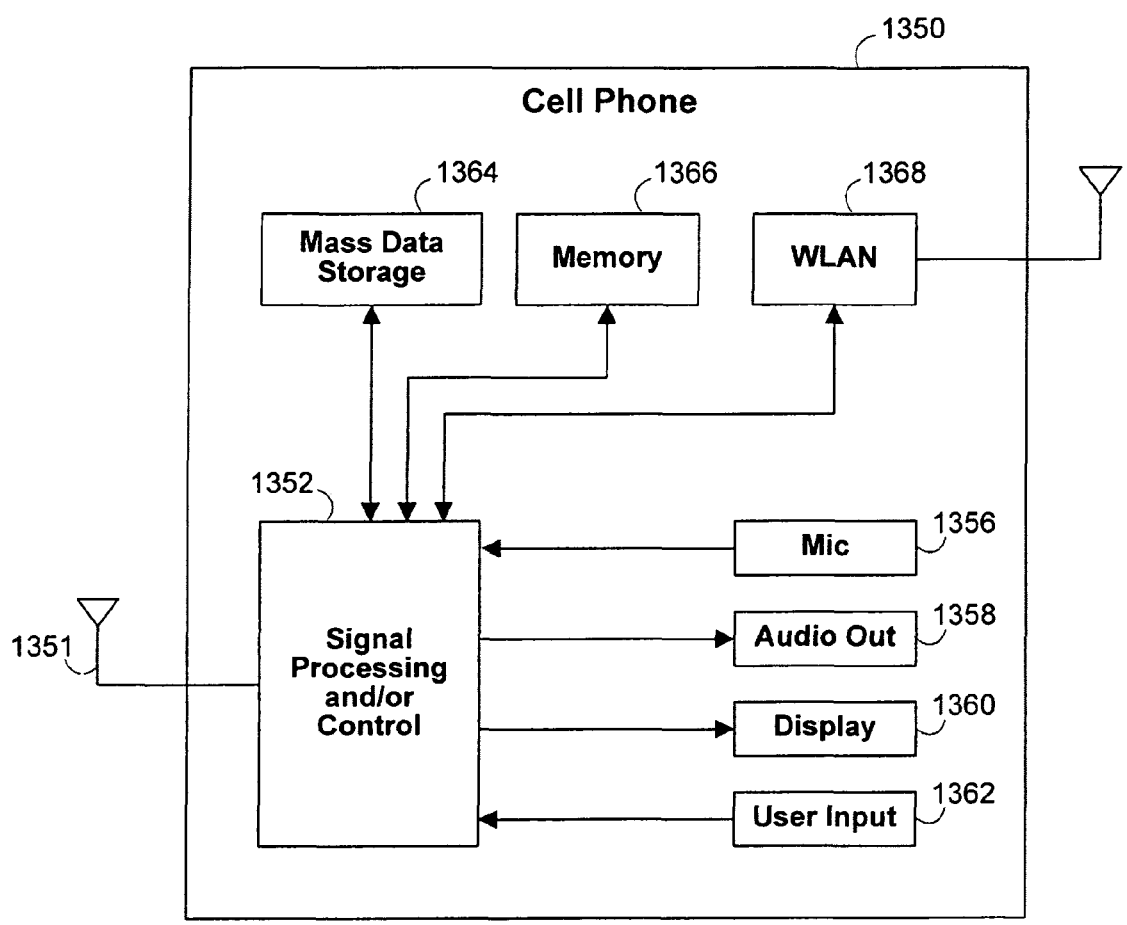
FIG. 13E is a block diagram of an exemplary cell phone that can employ the disclosed technology.

Referring now to FIG. 13D, the present invention may be implemented in a digital entertainment system 1332 of a vehicle 1330, which may include a WLAN interface 1344 and/or mass data storage 1340.

The digital entertainment system 1332 may communicate with mass data storage 1340 that stores data in a nonvolatile manner. The mass data storage 1340 may include optical and/or magnetic storage devices such as hard disk drives (HDDs) and/or DVD drives. The HDD may be a mini HDD that includes one or more platters having a diameter that is smaller than approximately 1.8". The digital entertainment system 1332 may be connected to memory 1342 such as RAM, ROM, nonvolatile memory such as flash memory and/or other suitable electronic data storage. The digital entertainment system 1332 also may support connections with a WLAN via the WLAN interface 1344. In some implementations, the vehicle 1330 includes an audio output 1334 such as a speaker, a display 1336 and/or a user input 1338 such as a keypad, touchpad and the like Referring now to FIG. 13E, the present invention can be implemented in a cellular phone 1350 that may include a cellular antenna 1351. The present invention may be implemented as part of either or both signal processing and/or control circuits, which are generally identified in FIG. 13E at 1352, a WLAN interface 1368 and/or mass data storage 1364 of the cellular phone 1350. In some implementations, the cellular phone 1350 includes a microphone 1356, an audio output 1358 such as a speaker and/or audio output jack, a display 1360 and/or an input device 1362 such as a keypad, pointing device, voice actuation and/or other input device. The signal processing and/or control circuits 1352 and/or other circuits (not shown) in the cellular phone 1350 may process data, perform coding and/or encryption, perform calculations, format data and/or perform other cellular phone functions.

The cellular phone 1350 may communicate with mass data storage 1364 that stores data in a nonvolatile manner such as optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". The cellular phone 1350 may be connected to memory 1366 such as RAM, ROM, nonvolatile memory such as flash memory and/or other suitable electronic data storage. The cellular phone 1350 also may support connections with a WLAN via a WLAN network interface 1368.

Figure 13F:
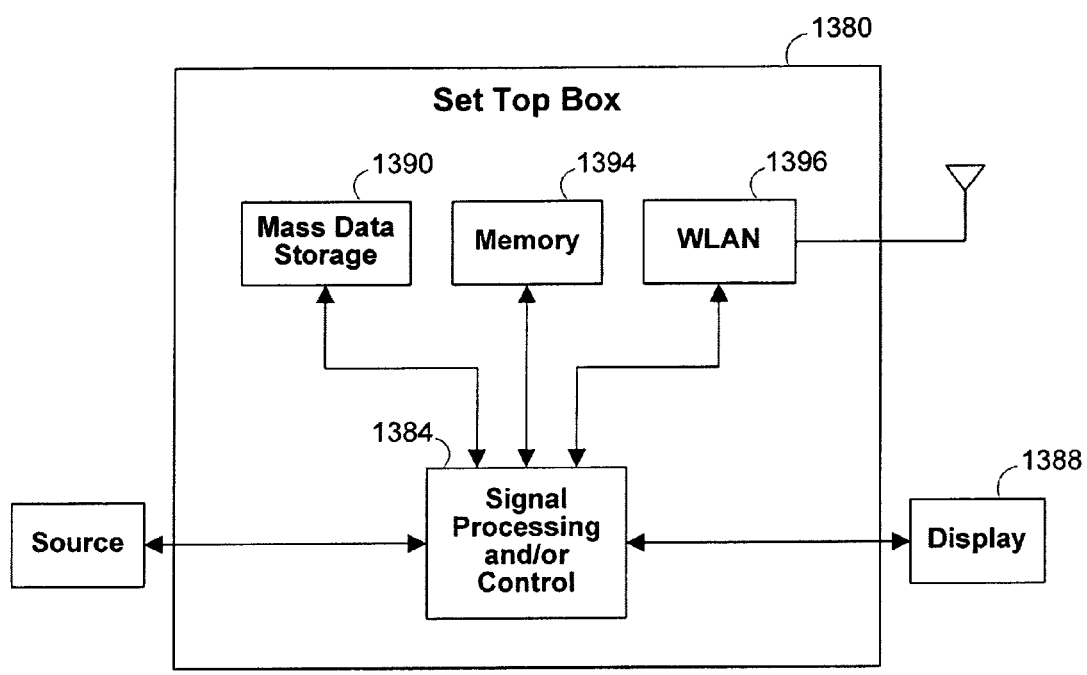
FIG. 13F is a block diagram of an exemplary set top box that can employ the disclosed technology.

Referring now to FIG. 13F, the present invention can be implemented in a set top box 1380. The present invention may be implemented as part of either or both signal processing and/or control circuits, which are generally identified in FIG. 13F at 1384, a WLAN interface 1396 and/or mass data storage 1390 of the set top box 1380. The set top box 1380 receives signals from a source such as a broadband source and outputs standard and/or high definition audio/video signals suitable for a display 1388 such as a television and/or monitor and/or other video and/or audio output devices. The signal processing and/or control circuits 1384 and/or other circuits (not shown) of the set top box 1380 may process data, perform coding and/or encryption, perform calculations, format data and/or perform any other set top box function.

The set top box 1380 may communicate with mass data storage 1390 that stores data in a nonvolatile manner. The mass data storage 1390 may include optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". The set top box 1380 may be connected to memory 1394 such as RAM, ROM, nonvolatile memory such as flash memory and/or other suitable electronic data storage. The set top box 1380 also may support connections with a WLAN via a WLAN network interface 1396.

Figure 13G:
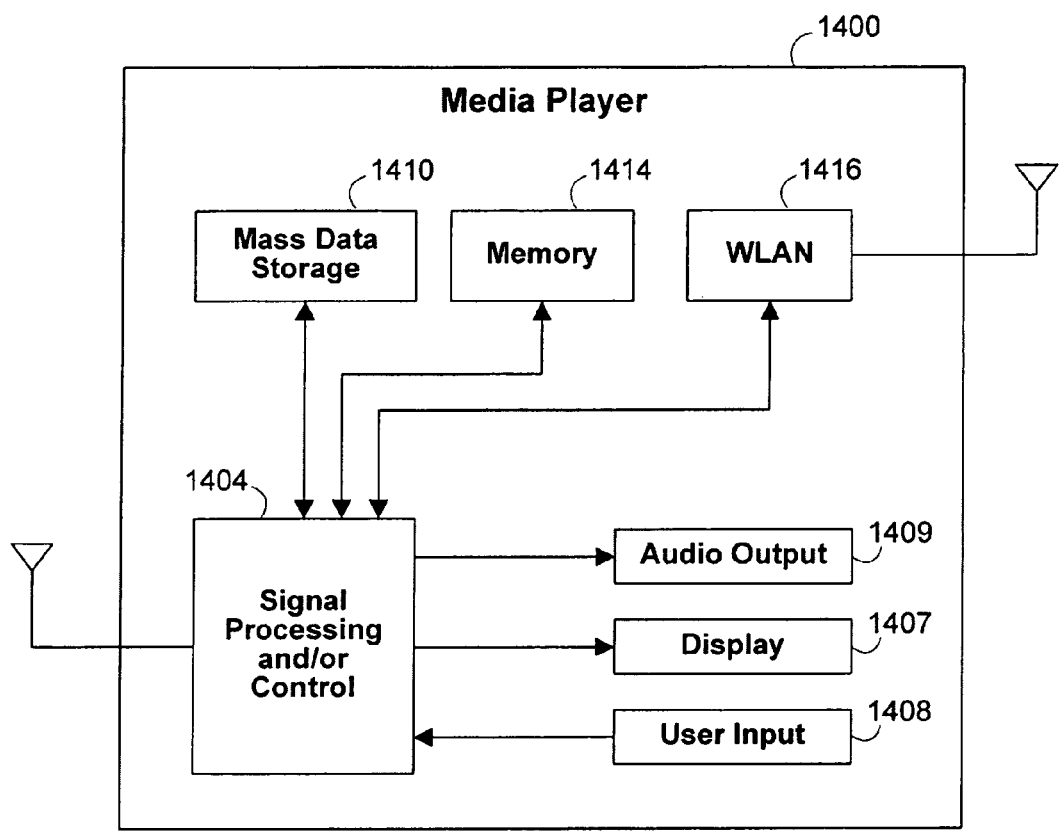
FIG. 13G is a block diagram of an exemplary media player that can employ the disclosed technology.

Referring now to FIG. 13G, the present invention can be implemented in a media player 1400. The present invention may be implemented as part of either or both signal processing and/or control circuits, which are generally identified in FIG. 13G at 1404, a WLAN interface 1416 and/or mass data storage 1410 of the media player 1400. In some implementations, the media player 1400 includes a display 1407 and/or a user input 1408 such as a keypad, touchpad and the like. In some implementations, the media player 1400 may employ a graphical user interface (GUI) that typically employs menus, drop down menus, icons and/or a point-and-click interface via the display 1407 and/or user input 1408. The media player 1400 further includes an audio output 1409 such as a speaker and/or audio output jack. The signal processing and/or control circuits 1404 and/or other circuits (not shown) of the media player 1400 may process data, perform coding and/or encryption, perform calculations, format data and/or perform any other media player function.

The media player 1400 may communicate with mass data storage 1410 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 13A and/or at least one DVD may have the configuration shown in FIG. 13B. The HDD may be a mini HDD that includes one or more platters having a diameter that is smaller than approximately 1.8". The media player 1400 may be connected to memory 1414 such as RAM, ROM, nonvolatile memory such as flash memory and/or other suitable electronic data storage. The media player 1400 also may support connections with a WLAN via a WLAN network interface 1416. Still other implementations in addition to those described above are contemplated.

The foregoing describes systems and methods for improving the visual quality of low-resolution video on large-screen displays. The above described embodiments of the present invention are presented for the purposes of illustration and not of limitation.

What is claimed is:

1. A method of processing video content captured at a capture frame rate for display on a video display at a video display frame rate, the method comprising:
    receiving a video signal corresponding to the video content at a transmitted frame rate different from the capture frame rate;
    detecting the capture frame rate from the received signal;
    determining whether the transmitted frame rate is higher than the capture frame rate; and
    responsive to the transmitted frame rate being determined to be higher than the capture frame rate:
        performing frame rate conversion, based on a ratio of the capture frame rate and the transmitted frame rate, to convert the received signal from the transmitted frame rate to the video display frame rate, wherein the video display frame rate is substantially higher than the capture frame rate.

2. The method of claim 1, wherein the video signal uses a first transmission standard, and the method further comprises outputting the converted video signal using a second transmission standard.

3. The method of claim 2, wherein the first transmission standard is the same as the second transmission standard.

4. The method of claim 1, wherein the video display frame rate is higher than the transmitted frame rate.

5. The method of claim 4, wherein the video display frame rate corresponds to a frame rate of the video display.

6. The method of claim 4, wherein the capture frame rate is 15 frames per second (fps), the transmitted frame rate is 30 fps, and the video display frame rate is 60 fps.

7. The method of claim 1, wherein performing frame rate conversion comprises:
    determining motion of objects in successive frames; and
    adding intermediate frames based on the determined motion.

8. The method of claim 7, wherein the motion of objects is determined based only on frames of the video content.

9. The method of claim 1, wherein detecting the capture frame rate comprises detecting frame replications in the video signal.

10. The method of claim 9, wherein detecting frame replications comprises comparing pixels of one frame to equivalent pixels in successive frames.

11. The method of claim 1, further comprising:
    determining whether the capture frame rate is below a predetermined threshold; and
    bypassing the frame rate conversion step if the capture frame rate is not below the predetermined threshold.

12. The method of claim 1, wherein performing frame rate conversion comprises:
    performing a first conversion to convert the received video signal to a video signal with a frame rate equivalent to the capture frame rate; and
    performing a second conversion to convert the converted video signal to a video signal with the video display frame rate.

13. The method of claim 1, wherein the received video signal has a first resolution that is higher than the resolution at which the video content was captured, and the method further comprises:
    detecting a resolution at which the video content was captured from the received video signal; and
    deinterlacing the video signal based on the detected resolution.

14. The method of claim 1, the method further comprising:
    reducing artifacts in the video signal; and
    enhancing the video signal.

15. The method of claim 14, wherein enhancing the video signal comprises one or more of color remapping, contrast enhancement, and film grain addition.

16. The method of claim 14, further comprising:
    detecting a compression quality of the video content; and
    bypassing the reducing step if the compression quality is greater than a threshold.

17. The method of claim 1, wherein the converted video signal includes each frame of the received signal.

18. A method of obtaining and processing video content for display on a display device, the method comprising:
    capturing the video content on a portable media device at a capture frame rate;
    receiving the captured video content at a transmitted frame rate on a device acting as an interface between the portable media device and the display device, wherein the transmitted frame rate is different from the capture frame rate; and
    converting the received video content having the transmitted frame rate to video content with a video display frame rate, based on a ratio of the capture frame rate and the transmitted frame rate, on the device acting as an interface between the portable media device and the display device, wherein the video display frame rate is substantially greater than the capture frame rate.

19. The method of claim 18, wherein the portable media device has telephonic capabilities.

20. The method of claim 18, wherein the device acting as an interface provides power to the portable media device.

21. The method of claim 18, wherein a primary function of the device acting as an interface is to process video content for display on the display device.

22. The method of claim 18, wherein the capture frame rate is determined by user settings.

23. The method of claim 18, wherein the capture frame rate is determined by video capture and encoding capabilities of the portable media device.

24. The method of claim 18, wherein the capture frame rate is determined by a transmission standard used by the device acting as an interface.

25. The method of claim 18, wherein the video display frame rate is at least twice as high as the capture frame rate.

26. The method of claim 18, further comprising providing the captured video content to the device acting as an interface using a video transmission standard, wherein the video transmission standard specifies a higher frame rate than the capture frame rate.

27. The method of claim 18, further comprising providing the captured video content to the device acting as an interface as a video signal at the capture frame rate.

28. The method of claim 27, wherein the captured video content is provided using a proprietary interface, the method further comprising encoding the video content at the video display frame rate on the device acting as an interface using a video transmission standard.

29. The method of claim 18, wherein performing frame rate conversion comprises:
   determining motion of objects in successive frames; and
   adding intermediate frames based on the determined motion.

30. A video format converter configured to process video content captured at a capture frame rate for display on a video display at a video display frame rate, the video format converter comprising:
   a receiver configured to receive a video signal corresponding to the video content at a transmitted frame rate different from the capture frame rate;
   detection circuitry configured to detect the capture frame rate from the received signal; and
   a frame rate converter configured to:
      determine whether the transmitted frame rate is higher than the capture frame rate; and
      responsive to the transmitted frame rate being determined to be higher than the capture frame rate, convert the received signal, based on a ratio of the capture frame rate and the transmitted frame rate, from the transmitted frame rate to the video display frame rate, wherein the video display frame rate is substantially higher than the capture frame rate.

31. The video format converter of claim 30, wherein the video signal uses a first transmission standard, and the video format converter further comprises an encoder for outputting the converted video signal using a second transmission standard.

32. The video format converter of claim 31, wherein the first transmission standard is the same as the second transmission standard.

33. The video format converter of claim 30, wherein the video display frame rate is higher than the transmitted frame rate.

34. The video format converter of claim 33, wherein the video display frame rate corresponds to a frame rate of the video display.

35. The video format converter of claim 33, wherein the capture frame rate is 15 frames per second (fps), the transmitted frame rate is 30 fps, and the video display frame rate is 60 fps.

36. The video format converter of claim 30, wherein the frame rate converter comprises circuitry to:
   determine motion of objects in successive frames; and
   add intermediate frames based on the determined motion.

37. The video format converter of claim 36, wherein the motion of objects is determined based only on frames of the video content.

38. The video format converter of claim 30, wherein the detection circuitry comprises replication detection circuitry configured to detect frame replications in the video signal.

39. The video format converter of claim 38, wherein the replication detection circuitry comprises a comparator configured to compare pixels of one frame to equivalent pixels in successive frames.

40. The video format converter of claim 30, further comprising:
   decision circuitry configured to determine whether the capture frame rate is below a predetermined threshold; and
   bypassing circuitry configured to bypass the frame rate converter if the capture frame rate is not below the predetermined threshold.

41. The video format converter of claim 30, wherein the frame rate converter comprises:
   a first converter configured to convert the received video signal to a video signal with a frame rate equivalent to the capture frame rate; and
   a second converter configured to convert the converted video signal to a video signal with the video display frame rate.

42. The video format converter of claim 30, wherein the received video signal has a first resolution that is higher than the resolution at which the video content was captured, and the video format converter further comprises:
   resolution detection circuitry configured to detect a resolution at which the video content was captured from the received video signal; and
   deinterlacing circuitry configured to deinterlace the video signal based on the detected resolution.

43. The video format converter of claim 30, the video format converter further comprising:
   noise reduction circuitry configured to reduce artifacts in the video signal; and
   enhancement circuitry configured to enhance the video signal.

44. The video format converter of claim 43, wherein the noise reduction circuitry comprises circuitry configured to perform one or more of 3D video noise reduction and MPEG noise reduction.

45. The video format converter of claim 43, wherein the enhancement circuitry comprises circuitry configured to perform one or more of color remapping, contrast enhancement, and film grain addition.

46. The video format converter of claim 43, further comprising:
   quality detection circuitry configured to detect a compression quality of the video content; and
   bypassing circuitry configured to bypass the noise reduction circuitry if the compression quality is greater than a threshold.

47. A dock including the video format converter defined in claim 30.

48. The dock of claim 47, wherein an interface of the dock is shaped to accept a video signal from one type of video providing device.

49. The dock of claim 47, further comprising selection circuitry configured to controllably bypass the included video format converter.

50. A display device including the video format converter defined in claim 30.

51. A media providing device including the video format converter defined in claim 30.

52. A system of obtaining and processing video content for display on a display device, the system comprising:
   a portable media device comprising video capturing circuitry configured to capture the video content at a capture frame rate; and a device acting as an interface between the portable media device and the display device, wherein the device receives the captured video content at a transmitted frame rate different from the capture frame rate, the device comprising:
  a frame rate converter configured to convert the received video content, having the transmitted frame rate, to video content with a video display frame rate based on a ratio of the capture frame rate and the transmitted frame rate, wherein the video display frame rate is substantially greater than the capture frame rate.

53. The system of claim 52, wherein the portable media device has telephonic capabilities.

54. The system of claim 52, wherein the device acting as an interface comprises power circuitry configured to provide power to the portable media device.

55. The system of claim 52, wherein a primary function of the device acting as an interface is to process video content for display on the display device.

56. The system of claim 52, wherein the capture frame rate is determined by user settings.

57. The system of claim 52, wherein the capture frame rate is determined by video capture and encoding capabilities of the video capturing circuitry.

58. The system of claim 52, wherein the capture frame rate is determined by a transmission standard used by an interface including the frame rate converter.

59. The system of claim 52, wherein the video display frame rate is at least twice as high as the capture frame rate.

60. The system of claim 52, further comprising a coupling device configured to provide the captured video content to the device acting as an interface using a video transmission standard, wherein the video transmission standard specifies a higher frame rate than the capture frame rate.

61. The system of claim 52, further comprising a coupling device configured to provide the captured video content to the device acting as an interface as a video signal at the capture frame rate.

62. The system of claim 61, wherein the coupling device is proprietary, and the device acting as an interface further comprises an encoder configured to encode the video content at the video display frame rate using a video transmission standard.

63. The system of claim 52, wherein the frame rate converter comprises circuitry to:
  determine motion of objects in successive frames; and
  add intermediate frames based on the determined motion.

\* \* \* \* \*